United States Patent
Poulsen

(10) Patent No.: US 9,473,876 B2
(45) Date of Patent: Oct. 18, 2016

(54) METHOD AND SYSTEM FOR TUNNELING MESSAGES BETWEEN TWO OR MORE DEVICES USING DIFFERENT COMMUNICATION PROTOCOLS

(71) Applicant: BlackBerry Limited, Waterloo (CA)

(72) Inventor: Jens Kristian Poulsen, Waterloo (CA)

(73) Assignee: BlackBerry Limited, Waterloo (CA)

( * ) Notice: Subject to any disclaimer, the term of this patent is extended or adjusted under 35 U.S.C. 154(b) by 247 days.

(21) Appl. No.: 14/242,010

(22) Filed: Apr. 1, 2014

(65) Prior Publication Data

US 2015/0281871 A1 Oct. 1, 2015

Related U.S. Application Data

(60) Provisional application No. 61/973,247, filed on Mar. 31, 2014.

(51) Int. Cl.
| | |
|---|---|
| *H04W 4/00* | (2009.01) |
| *H04L 29/06* | (2006.01) |
| *H04W 74/00* | (2009.01) |
| *H04W 76/02* | (2009.01) |
| *G06F 13/40* | (2006.01) |
| *H04L 12/40* | (2006.01) |

(Continued)

(52) U.S. Cl.
CPC .......... *H04W 4/005* (2013.01); *G06F 13/4027* (2013.01); *H04L 12/40169* (2013.01); *H04L 12/46* (2013.01); *H04L 12/4633* (2013.01); *H04L 12/66* (2013.01); *H04L 69/08* (2013.01); *H04W 74/002* (2013.01); *H04W 76/022* (2013.01)

(58) Field of Classification Search
CPC ................ H04W 29/06068; H04W 29/06095; H04W 4/005; H04W 74/002; H04W 76/022; H04L 69/08; H04L 49/30; H04L 2012/5614; H04Q 11/0428; H04Q 11/0471
USPC ............ 370/466, 359, 419, 463, 395.5, 401
See application file for complete search history.

(56) References Cited

U.S. PATENT DOCUMENTS

| | | | |
|---|---|---|---|
| 3,710,262 | A | 1/1973 | Sorensen |
| 3,810,111 | A | 5/1974 | Patel |

(Continued)

FOREIGN PATENT DOCUMENTS

| | | |
|---|---|---|
| CA | 2759946 A1 | 6/2012 |
| CN | 101336561 B | 7/2012 |

(Continued)

OTHER PUBLICATIONS

Hanigk, Extended European Search Report for EP 15159170.8, Aug. 21, 2015.

(Continued)

*Primary Examiner* — Warner Wong
(74) *Attorney, Agent, or Firm* — Integral Intellectual Property Inc.; Miriam Paton; Amy Scouten

(57) ABSTRACT

Various embodiments are described herein for a multiformat communication protocol that may be used to tunnel messages suitable for a second communication protocol. The multiformat communication protocol may be used by an intermediate device to couple a bus that communicates according to the multiformat communication protocol with a bus that communicates according to the second communication protocol.

25 Claims, 19 Drawing Sheets

(51) Int. Cl.
*H04L 12/46* (2006.01)
*H04L 12/66* (2006.01)

(56) References Cited

U.S. PATENT DOCUMENTS

| | | | |
|---|---|---|---|
| 3,883,729 A | 5/1975 | de Cremiers | |
| 3,995,264 A | 11/1976 | Ouchi | |
| 4,321,483 A | 3/1982 | Dugan | |
| 4,530,088 A | 7/1985 | Hamstra et al. | |
| 4,592,077 A | 5/1986 | Norton | |
| 4,817,117 A | 3/1989 | Tasto et al. | |
| 4,907,222 A | 3/1990 | Slavik | |
| 5,012,240 A | 4/1991 | Takahashi et al. | |
| 5,060,227 A | 10/1991 | Finley et al. | |
| 5,210,846 A | 5/1993 | Lee | |
| 5,237,322 A | 8/1993 | Heberle | |
| 5,297,181 A | 3/1994 | Barr et al. | |
| 5,398,326 A | 3/1995 | Lee | |
| 5,459,722 A | 10/1995 | Sherif | |
| 5,495,240 A | 2/1996 | Heberle | |
| 5,532,556 A | 7/1996 | Anderson et al. | |
| 5,577,044 A | 11/1996 | Oxford | |
| 5,856,975 A | 1/1999 | Rostoker et al. | |
| 5,862,354 A | 1/1999 | Curiger et al. | |
| 5,864,872 A | 1/1999 | Lee et al. | |
| 5,903,607 A | 5/1999 | Tailliet | |
| 6,009,389 A | 12/1999 | Dokic et al. | |
| 6,026,088 A | 2/2000 | Rostoker et al. | |
| 6,108,751 A | 8/2000 | Lee et al. | |
| 6,145,007 A | 11/2000 | Dokic et al. | |
| 6,182,180 B1 | 1/2001 | Liu et al. | |
| 6,205,504 B1 | 3/2001 | Faust et al. | |
| 6,438,434 B1 | 8/2002 | Kamiya | |
| 6,507,299 B1 | 1/2003 | Nuijten | |
| 6,532,506 B1 | 3/2003 | Dunstan et al. | |
| 6,535,505 B1 | 3/2003 | Hwang et al. | |
| 6,539,443 B1 | 3/2003 | Dunstan et al. | |
| 6,567,780 B2 | 5/2003 | Rhoads | |
| 6,697,897 B1 | 2/2004 | Friel et al. | |
| 6,737,957 B1 | 5/2004 | Petrovic et al. | |
| 6,874,052 B1 | 3/2005 | Delmonico | |
| 6,904,110 B2 | 6/2005 | Trans et al. | |
| 6,931,370 B1 | 8/2005 | McDowell | |
| 6,944,298 B1 | 9/2005 | Rhoads | |
| 6,947,893 B1 | 9/2005 | Iwaki et al. | |
| 7,054,280 B2 | 5/2006 | Novak et al. | |
| 7,099,970 B1 | 8/2006 | Foegelle et al. | |
| 7,181,557 B1 | 2/2007 | Falik et al. | |
| 7,200,782 B2 | 4/2007 | Vining | |
| 7,245,630 B1 | 7/2007 | Chen et al. | |
| 7,292,876 B2 | 11/2007 | Bosch et al. | |
| 7,324,159 B2 | 1/2008 | Eveleens et al. | |
| 7,365,669 B1 | 4/2008 | Melanson | |
| 7,406,100 B2 | 7/2008 | Rocas et al. | |
| 7,519,005 B2 | 4/2009 | Hejdeman et al. | |
| 7,590,070 B1 | 9/2009 | Asawa et al. | |
| 7,606,955 B1 | 10/2009 | Falik et al. | |
| 7,668,202 B2 | 2/2010 | Gillet | |
| 8,103,869 B2 | 1/2012 | Balandin et al. | |
| 8,161,224 B2 | 4/2012 | Laurencin et al. | |
| 8,775,707 B2 | 7/2014 | Poulsen | |
| 2002/0120671 A1* | 8/2002 | Daffner | H04L 12/2602 709/201 |
| 2002/0152299 A1* | 10/2002 | Traversat | G06F 9/4416 709/223 |
| 2004/0068535 A1 | 4/2004 | Subbiah et al. | |
| 2004/0116151 A1 | 6/2004 | Bosch et al. | |
| 2004/0233917 A1 | 11/2004 | Rocas et al. | |
| 2005/0049020 A1 | 3/2005 | Higgins et al. | |
| 2005/0135387 A1* | 6/2005 | Rychener | H04L 29/06027 370/401 |
| 2005/0190743 A1* | 9/2005 | Marcu | H04L 12/66 370/352 |
| 2005/0259609 A1 | 11/2005 | Hansquine et al. | |
| 2006/0187969 A1 | 8/2006 | Kadowaki | |
| 2007/0121006 A1 | 5/2007 | Kim | |
| 2007/0162665 A1 | 7/2007 | Lee | |
| 2007/0232266 A1 | 10/2007 | Pinder et al. | |
| 2008/0163663 A1 | 7/2008 | Hankey et al. | |
| 2008/0181186 A1 | 7/2008 | Rofougaran | |
| 2008/0279320 A1 | 11/2008 | Rocas et al. | |
| 2009/0024235 A1 | 1/2009 | Kim | |
| 2009/0116475 A1 | 5/2009 | Krzyzanowski et al. | |
| 2009/0119439 A1 | 5/2009 | Zou et al. | |
| 2009/0302806 A1 | 12/2009 | Lindlar et al. | |
| 2009/0323975 A1 | 12/2009 | Groesch | |
| 2010/0022183 A1 | 1/2010 | Ryle et al. | |
| 2010/0260362 A1 | 10/2010 | Sander et al. | |
| 2010/0315964 A1 | 12/2010 | Kim et al. | |
| 2012/0014530 A1 | 1/2012 | Yamkovoy | |
| 2012/0144078 A1 | 6/2012 | Poulsen | |
| 2012/0203560 A1 | 8/2012 | Poulsen | |
| 2013/0108068 A1 | 5/2013 | Poulsen et al. | |
| 2013/0174208 A1 | 7/2013 | Lee et al. | |
| 2013/0322461 A1 | 12/2013 | Poulsen | |
| 2013/0322462 A1 | 12/2013 | Poulsen | |
| 2014/0146861 A1* | 5/2014 | Li | H04B 1/40 375/219 |
| 2014/0247834 A1 | 9/2014 | Poulsen | |
| 2014/0281484 A1* | 9/2014 | Kurkowski | H04L 63/0471 713/153 |
| 2015/0256384 A1* | 9/2015 | Van Den Hurk | H04L 61/2038 709/220 |

FOREIGN PATENT DOCUMENTS

| | | |
|---|---|---|
| CN | 102591834 A | 7/2012 |
| EP | 0405968 B1 | 9/1995 |
| EP | 0693729 B1 | 2/2000 |
| EP | 2466481 A1 | 6/2012 |
| EP | 2775654 A1 | 9/2014 |
| JP | 58095447 | 6/1983 |
| JP | 58101541 | 6/1983 |
| WO | 2004086614 A1 | 10/2004 |
| WO | 2007068500 A1 | 6/2007 |
| WO | 2009045904 | 4/2009 |
| WO | 2010010278 A1 | 1/2010 |
| WO | 2012012309 A1 | 1/2012 |
| WO | 2013177664 A1 | 12/2013 |
| WO | 2013177665 A1 | 12/2013 |

OTHER PUBLICATIONS

Suk-Hyun, et al., "A Reliable Gateway for In-Vehicle Networks Based on LIN, CAN, and FlexRay", ACM Transactions on Embedded Computing Systems, vol. 11, No. 1, Article 7, Publication date: Mar. 1, 2012.
Atmel Corporation. AVR318: Dallas 1-Wire master. Application Note. 2004.
Springbok Digitronics. 1-Wire FAQ. Design Guide v1.0. Aug. 19, 2004.
Awtrey, Dan. Transmitting Data and Power over a One-Wire Bus. Feb. 1997.
Document relating to U.S. Appl. No. 13/020,850 dated Dec. 17, 2013 (Office Action).
hi-mobile.net, i.Tech Clip D-Radio Bluetooth Stereo Headset with Display Product Information, downloaded from http://www.hi-mobile.net/i-tech-bluetooths-clip-d-radio on Apr. 2010.
Nokia Stuff, Nokia BH-216 Bluetooth Headset with Display Product Information, downloaded from http://www.nokiastuff.net/nokia-bh-216-bluetooth-headset-with-display on Apr. 2010.
The Society of Motion Picture and Television Engineers. Proposed SMPTE Standard for Television—Format for Non-PCM Audio and Data in an AES3 Serial Digital Audio Interface, SMPTE Journal, Apr. 2000.
International Telecommunication Union, Procedures for the simultaneous transmission of data and digitally encoded voice signals over the GSTN, or over a 2-wire leased point to point telephone type circuits, Aug. 1, 1996.
Walt Kester, MT-022 Tutorial: ADC Architectures III: Sigma-Delta ADC Basics, 2009.

(56) References Cited

OTHER PUBLICATIONS

NXP Semiconductors, TFA9881: PDM input mono class D audio amplifier, marked as confidential as of May 18, 2009.
Document relating to U.S. Appl. No. 13/784,457 dated Nov. 8, 2013 (Preliminary Amendment).
Document relating to U.S. Appl. No. 13/803,393, dated Jun. 6, 2013 (Preliminary Amendment).
Document relating to U.S. Appl. No. 13/784,457, dated Mar. 18, 2013 (Preliminary Amendment).
Document relating to U.S. Appl. No. 13/784,457, dated Mar. 8, 2013 (Preliminary Amendment).
Maxim Integrated Products, Overview of 1-Wire Technology and Its Use, http://pdfserv.maxim-ic.com/en/an/AN1796.pdf, Jun. 19, 2008.
Downs, "Using 1-Wire I/O for Distributed System Monitoring", The AIAA/IEEE/SAE Digital Avionics Systems Conference Proceedings, Sep. 15, 1998, pp. 161-168, XP010305393.
Prosecution Documents for U.S. Appl. No. 12/958,942, application allowed Feb. 26, 2014.
Document relating to U.S. Appl. No. 13/282,577, dated Feb. 20, 2014 (Office Action).
Document relating to U.S. Appl. No. 13/020,850, dated Mar. 17, 2014 (Informal or Non-responsive amendment).
Document relating to U.S. Appl. No. 13/020,850 dated Mar. 21, 2014 (Notice re non-compliant or non-responsive amendment).
Future Technology Devices International Ltd. FT201X (USB I2C Slave IC) Datasheet Version 1.3, 2013.
SMSC USB3503, USB 2.0 HSIC High-Speed Hub Controller Optimized for Portable Applications Datasheet Revision 1.1 (Feb. 7, 2013).
Texas Instruments USB Interface Adapter Evaluation Module User's Guide, Literature No. SLLU093, Aug. 2006.
Cypress Semiconductor Corporation USB Hi-Speed Hubs webpages printed from www.cypress.com/?id-183&source=header, printed Apr. 2, 2014.
Robot Electronics—Using the I2C Bus, I2C Tutorial webpages printed from www.robot-electronics.co.uk/acatalog/I2C_Tutorial.html, printed Nov. 28, 2013.
Linear Technology Corporation Datasheet—LTC4099, I2C Controlled USB Power Manager/Charger with Overvoltage protection, pp. 21-22, 2008.
Wikipedia—I2C, webpages prinited from http://en.wikpedia.org/wiki/I2C, printed Nov. 28, 2013.
Philips Semiconductors, The I2C-Bus Specification, Version 2.1, Jan. 2000.
Ito T. et al.: "mB1C Code and Its Performance in an Optical Communication System", IEEE Transactions on Communications, IEEE Service Center, Piscataway, NJ, USA, vol. COM-32, No. 2, Feb. 1, 1984, pp. 163-168, XP000758558, ISSN: 0090-6778.
Fairhurst G.: "Manchester Encoding", Internet Citation, Sep. 2001, XP002348542, Retrieved from the Internet: URL: http://www.erg.abdn.ac.uk/users/gorry/course/phy-pages/man.html [retrieved on Oct. 11, 2005].
Document relating to U.S. Appl. No. 13/020,850, dated Sep. 2, 2014 (Response with Terminal Disclaimer).
Document relating to U.S. Appl. No. 13/020,850, dated Sep. 15, 2014 (Notice of Allowance).
Final Office Action. U.S. Appl. No. 13/282,577. Dated: Sep. 25, 2014.
Petition to Withdraw an Application from Issue after Payment of the Issue Fee under 37 CFR 1.313(c). U.S. Appl. No. 13/020,850. Dated: Jan. 21, 2015.
Decision on Petition. U.S. Appl. No. 13/020,850. Dated: Jan. 21, 2015.
Request for Continued Examination (RCE). U.S. Appl. No. 13/020,850. Dated: Jan. 21, 2015.
Patent Withdrawal Notice. U.S. Appl. No. 13/020,850. Dated: Jan. 22, 2015.
Notice of Allowance. U.S. Appl. No. 13/020,850. Dated: Feb. 3, 2015.
Benjamin W. Wah, Xiao Su and Dong Lin. A Survey of Error-Concealment Schemes for Real-Time Audio and Video Transmissions over the Internet. Department of Electrical and Computer Engineering and the Coordinated Science Laboratory University of Illinois at Urbana-Champaign, Urbana, IL 61801, USA Dec. 2000.
Wen-Tsai Liao, Jeng-Chun Chen and Ming-Syan CHEN. Adaptive Recovery Techniques for Real-Time Audio Streams. Electrical Engineering Department National Taiwan University, Taipei, Taiwan, ROC. Apr. 2001.
Prima LT Users Guide—Feature Overview and Model Description. Online at <http://www.musicamusa.com/techdocs/Manual/lt/ltuser1.PDF> Available as early as Apr. 2001.

* cited by examiner

| S synchronization field | | | | | | | | | | | | | | | |
|---|---|---|---|---|---|---|---|---|---|---|---|---|---|---|---|
| Error control | CONSTANT SYNC SYMBOL (w) | | | | | | | | | DYNAMIC SYMBOL (w) | | | | | Error control |
| S15 | S14 | S13 | S12 | S11 | S10 | S9 | S8 | S7 | S6 | S5 | S4 | S3 | S2 | S1 | S0 |
| IRQS (r) | PAR (w) | 1 | 0 | 1 | 1 | 0 | 0 | 0 | 1 | 1 | CRC generator | | | | ACK |

FIG. 5D

| X command field | | | | | | | | | | | | | | | | |
|---|---|---|---|---|---|---|---|---|---|---|---|---|---|---|---|---|
| Type | X15 | X14 | X13 | X12 | X11 | X10 | X9 | X8 | X7 | X6 | X5 | X4 | X3 | X2 | X1 | X0 |
| PING | 0 (w) | 0 (w) | 0 (w) | REQ BUS (r) | REL BUS (w) | FRA SYN (w) | STATUS DEVICE 11 | | STATUS DEVICE 10 | | STATUS DEVICE 9 | | STATUS DEVICE 8 | | STATUS DEVICE 7 (r) | |
|  | 0 (w) | 0 (w) | 1 (w) | RESERVED | | | | | | | | | | | | |
| WR8 | 0 (w) | 1 (w) | 0 (w) | DEV3-0 (w) | | | | | ADDRESS (15-7) (w) | | | | | | | |
| RD8 | 0 (w) | 1 (w) | 1 (w) | | | | | | | | | | | | | |
|  | 1 (w) | 0 (w) | 0 (w) | RESERVED | | | | | | | | | | | | |
|  | 1 (w) | 0 (w) | 1 (w) | | | | | | | | | | | | | |
|  | 1 (w) | 1 (w) | 0 (w) | | | | | | | | | | | | | |
|  | 1 (w) | 1 (w) | 1 (w) | | | | | | | | | | | | | |

FIG. 5E

| Y command field | | | | | | | | | | | | | | | | |
|---|---|---|---|---|---|---|---|---|---|---|---|---|---|---|---|---|
| Type | Y15 | Y14 | Y13 | Y12 | Y11 | Y10 | Y9 | Y8 | Y7 | Y6 | Y5 | Y4 | Y3 | Y2 | Y1 | Y0 |
| PING | STATUS DEVICE 6 (r) | | STATUS DEVICE 5 (r) | | STATUS DEVICE 4 (r) | | Res'd | BANK | STATUS DEVICE 3 | | STATUS DEVICE 2 | | STATUS DEVICE 1 | | STATUS DEVICE 0 | |
| Reserved | RESERVED (NO ACTION) | | | | | | | | | | | | | | | |
| WR8 | ADDR 6-0 (w) | | | | | | | BANK | WD 7-0 (w) | | | | | | | |
| RD8 | | | | | | | | | RD 7-0 (r) | | | | | | | |

FIG. 5F

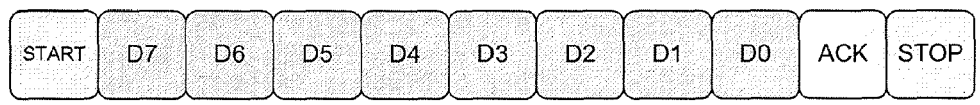
 Start of transmission or a restart (from the I²C master device)
 Data (generally from the I²C master device or the I²C slave device, depending on the direction)
 ACK or NACK (may use ACK at end of the frame) from the I²C master device or the I²C slave device
 End of transmission (from the I²C master device)
FIG. 6

I²C Command port

| Address | B7 | B6 | B5 | B4 | B3 | B2 | B1 | B0 |
|---|---|---|---|---|---|---|---|---|
| Function | PORT | | | | RESERVED | START | Next transaction | |

FIG. 7A

| Previous START | Current START | Function |
|---|---|---|
| 0 | 0 | Idle (no I²C bus activity) |
| 0 | 1 | Activate (I²C START) & transfer I²C bus DATA |
| 1 | 0 | Transfer I²C bus DATA & Terminate (I²C STOP) |
| 1 | 1 | Transfer I²C bus DATA |

FIG. 7B

| X1 | X0 | Current I²C transaction | Next I²C transaction |
|---|---|---|---|
| 0 | 0 | Same as given by the multiformat interface operation, e.g. 8 bit read of data results in 8 bit I²C transaction on the bus | None |
| 0 | 1 | | Prepare 8 bit read |
| 1 | 0 | | Prepare 16 bit read |
| 1 | 1 | | Resubmit START |

FIG. 7C

| Address | Current I²C operation | START | Next transaction | Register function |
|---|---|---|---|---|
| 0x00 | Same type as given by the multi format operation, e.g. an 8 bit read gives the result of an 8 bit I²C value read from bus | 0 | None | I²C DATA |
| 0x01 | | 0 | 8 bit read | |
| 0x02 | | 0 | 16 bit read | |
| 0x03 | | 0 | Reserved | |
| 0x04 | | 1 | None | |
| 0x05 | | 1 | 8 bit read | |
| 0x06 | | 1 | 16 bit read | |
| 0x07 | | 1 | Resubmit START | |
| 0x8-0xF | Reserved | | | |

FIG. 7D

| Framerate [kHz] | Framelength [bits] | I²C clock (min) [kHz] | I²C clock (max) [kHz] |
|---|---|---|---|
| 8 | 48 | 80 | 128 |
| 8 | 3072 | 80 | 8192 (3400) |
| 16 | 48 | 160 | 256 |
| 16 | 1536 | 160 | 8192 (3400) |
| 48 | 48 | 480 | 768 |
| 48 | 800 | 480 | 12800 (3400) |

METHOD AND SYSTEM FOR TUNNELING MESSAGES BETWEEN TWO OR MORE DEVICES USING DIFFERENT COMMUNICATION PROTOCOLS

FIELD

The various embodiments described herein generally relate to a method and system for tunneling data using an interface having a different communication protocol.

BACKGROUND

In a computer or processor architecture, a bus is a subsystem that transfers data between devices within an electronic device or transfers data between electronic devices. Bus architectures are also used in common data signalling paths for multiple devices rather than having separate connections between each set of devices that may communicate with one another. In other words, the bus structure can be used to allow one or more slave devices to communicate with one or more master devices.

For example, the $I^2C$ (Inter-Integrated Circuit) bus is a single-ended serial communication bus that is used to connect a low-speed electronic device to other electronic devices and allows for control of a wide variety of electronic devices. However, the $I^2C$ bus or $I^2C$ interface has a low bandwidth, limited capabilities and has no support for isochronous data streams. Therefore, several newer interfaces have been developed, which all have greater capabilities than the $I^2C$ interface. However, these newer interfaces are not backwards compatible with the $I^2C$ interface, which means these newer interfaces cannot control devices that communicate according to the $I^2C$ bus communication protocol, even though these newer interfaces have the required bandwidth and control capability.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described.

FIG. 6 is an example of transmitting data using the $I^2C$ communication protocol.

FIG. 7A is an example of using address bits as status bits for an $I^2C$ command port that can be used to communicate $I^2C$ messages using the multiformat communication protocol.

FIG. 7B is an example embodiment of using an address bit associated with a port to signify status bits for the $I^2C$ command.

FIG. 7C is an example embodiment of using two address bits of the $I^2C$ command port to signify different $I^2C$ commands using the multiformat communication protocol.

FIG. 7D is a conceptual illustration of using three address bits from an $I^2C$ port register map for performing $I^2C$ operations using the multiformat communication protocol.

FIG. 7E is a table showing example frame rates, frame lengths and clock speeds using the multiformat communication protocol to transfer $I^2C$ messages.

FIG. 9B is another example embodiment of tunneling $I^2C$ commands in a control space when using the multiformat communication protocol to implement various $I^2C$ commands.

FIG. 9D is another example embodiment of bit allocations in a control space when using the multiformat communication protocol to implement various $I^2C$ commands.

DETAILED DESCRIPTION OF THE EMBODIMENTS

Figure 1:
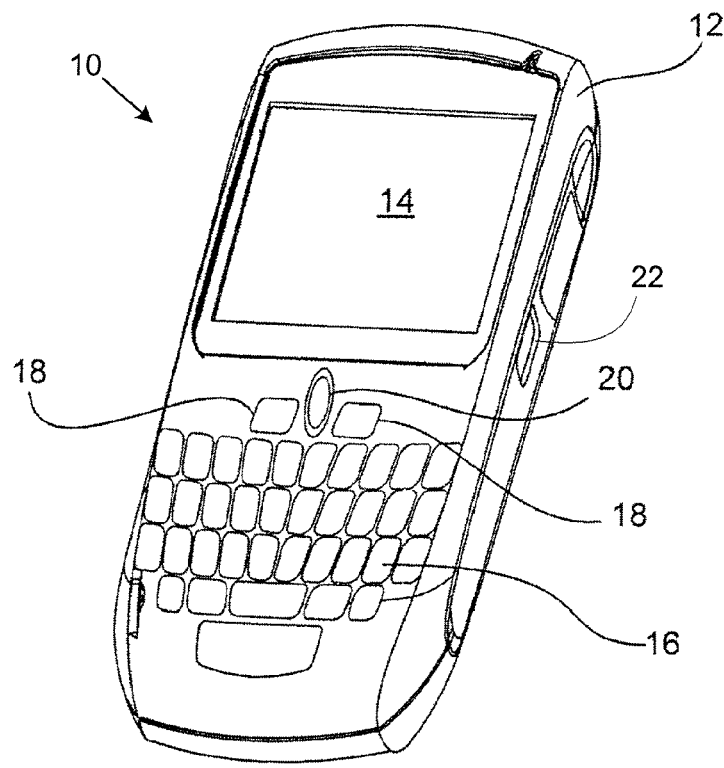
FIG. 1 is a perspective view of an example embodiment of a portable electronic device (also known as a mobile device).

Various apparatuses or processes will be described below to provide an example of an embodiment of each claimed subject matter. No embodiment described below limits any claimed subject matter and any claimed subject matter may cover processes or apparatuses that differ from those described below. The claimed subject matter is not limited to apparatuses or processes having all of the features of any one apparatus or process described below or to features common to multiple or all of the apparatuses or processes described below. It is possible that an apparatus or process described below is not an embodiment that is recited in any claimed subject matter. Any subject matter disclosed in an apparatus or process described herein that is not claimed in this document may be the subject matter of another protective instrument, for example, a continuing patent application, and the applicants, inventors or owners do not intend to abandon, disclaim or dedicate to the public any such subject matter by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the example embodiments described herein in any way, but rather as merely describing the implementation of various embodiments as described.

The example embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile and non-volatile memory and/or storage elements). These devices may also have at least one input device (e.g. a keyboard, mouse, a touchscreen, and the like), and at least one output device (e.g. a display screen, a printer, a wireless radio, and the like) depending on the nature of the device.

These devices also have at least one input port and at least one output port that are connected to a bus to transmit or receive data and/or commands. The data can be audio data, numerical data, visual information, point information and so on. The term "port" means that a number of channels associated with an input port or an output port may be programmed so that the channels can be used in a certain manner. The number of channels of a port may be related to the function of the device to which the port belongs. For example, a digital stereo connection is a two channel port.

As an example, and without limitation, the aforementioned programmable devices may include servers, personal computers, laptops, tablets, personal data assistants (PDA), cell phones, smart phones, gaming devices, stereos, DVD players, Blu-ray players, TVs including HDTVs, car audio, beamforming audio (e.g. audio sound bars consisting of multiple speaker elements). Program code can be applied to input data and/or output data to perform the functionality described herein.

It should also be noted that there may be some elements that are used to implement at least part of one of the embodiments described herein that may be implemented via software that is written in a high-level procedural language such as object oriented programming. Accordingly, the program code may be written in C, $C^{++}$ or any other suitable programming language and may comprise modules or classes, as is known to those skilled in object oriented programming. For example, some device drivers, such as those which determine what to do with the data received from a bus and/or those that determine how to send messages to or interpret messages from the bus, may be implemented using a higher-level language. Alternatively, or in addition thereto, some of these elements implemented via software may be written in assembly language, machine language or firmware as needed. For example, at least some of the elements may be implemented using a language that is RTL based and suited for silicon implementation such as Verilog, or VHDL. In either case, the language may be a compiled or interpreted language.

At least some of these software programs may be stored on a storage media (e.g. a computer readable medium such as, but not limited to, ROM, magnetic disk, optical disc) or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods of the embodiments described herein may be capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage. In alternative embodiments, the medium may be transitory in nature such as, but not limited to, wire-line transmissions, satellite transmissions, internet transmissions (e.g. downloads), media, digital and analog signals, and the like. The computer useable instructions may also be in various formats, including compiled and non-compiled code.

It should also be noted that the term coupled as used herein can have several different meanings depending in the context in which the term is used. For example, the term coupling can have a mechanical, electrical or communicative connotation. For example, in some contexts, the term coupling indicates that two elements or devices can be physically connected to one another or connected to one another through one or more intermediate elements or devices via a direct coupling, such as a wire or cable, for example. In some contexts, the term coupling indicates that two elements or devices can be connected through other means such as a wireless signal, an optical signal, a magnetic signal or an electrical signal when possible, for example. Furthermore, the term "communicative coupling" indicates that an element or device can electrically, magnetically, optically, or wirelessly send data to another element or device as well as receive data from another element or device.

It should also be noted that, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should also be noted that the terms "master" and "slave" as used herein are meant purely from a technological point of view and in particular denote the technical relationship between a host device or a first element and a peripheral device or a second element in which the first element or master device provides instructions or control signals to the second element or slave device. Accordingly, the use of the terms "master" and "slave" as used herein is not meant to carry any connotation beyond the technical meaning given here.

It should also be noted that although the communication schemes are described herein with various example embodiments that show a data bus that couples various elements together, the communication schemes according to the teachings herein can also be implemented over a different interface such as a wireless or optical interface, when applicable.

The detailed description begins with a general description of issues related to the $I^2C$ communication protocol and how these issues may be addressed by using a technique in which a multiformat communication protocol is used to transfer $I^2C$ commands and $I^2C$ data. The term $I^2C$ messages shall be used herein to refer to both $I^2C$ commands and $I^2C$ data. To facilitate in the description of this technique, a mobile device is generally described along with a multiformat communication protocol. Various example embodiments will then be described to show how the multiformat communication protocol can be modified to transmit $I^2C$ messages.

As previously described, an $I^2C$ bus that transmits data according to the $I^2C$ communication protocol is a single-ended serial communication bus that is used to connect electronic devices to one another and enable these devices to be controlled and/or to transmit and receive data. However, the $I^2C$ communication protocol (which may also be referred to as an $I^2C$ interface) has low bandwidth, limited capabilities and no support for isochronous data streams. Some newer communication protocols have been developed that are superior to $I^2C$ but are not backwards compatible with $I^2C$. Therefore, it may be useful to be able to provide a mechanism to allow a newer higher bandwidth communication protocol to control older devices that communicate according to $I^2C$.

In accordance with the teachings herein, various embodiments are provided for using a multiformat communication protocol to transmit $I^2C$ messages. These embodiments may be capable of providing low latency response, low gate count and support for legacy $I^2C$ devices provided that the messages are carefully encoded in a suitable format that covers the actions taken on an $I^2C$ bus. Low latency may also be achieved by using at least one of time multiplexing of $I^2C$ messages, using one or more buffers for communication between a master device and a slave device or using one or more buffers for communication between a master device and a controller, such as a baseband controller, for example, that provides the master device with $I^2C$ messages. In addition, at least some of the embodiments according to the teachings herein may also be used to enable a baseband controller to send out multiple $I^2C$ write messages thereby quickly setting up an $I^2C$ bus without requiring extensive interrupts to the baseband processor.

In some cases, the multiformat communication protocol may be used to directly transfer $I^2C$ messages without delay. In other cases, the receiving end may be too slow to support the same speed as at the transmitting end, in which case the messages may need to be retransmitted or the clock may be pulled low at the transmitting end to slow down the transmitting end for some time. This depends on the speed of the receiving end.

It should be understood that a baseband controller may be a controller that controls the operation of a master device. The controller may be implemented as a CPU, a DSP or some other control device, as is known by those skilled in the art. For example, the main processor inside a handheld device that is used for executing various programs may be used as the baseband controller through a memory mapped register, through a register based interface or through a pipelined command processor to control the master device. A pipeline command processor may receive commands from the baseband processor quickly, and transmit them later, when there is available bandwidth. However, the buffer size for the pipeline command processor may be limited, so at a certain point the pipeline command processor may inform the baseband processor that the buffer is full and it will have to wait for a certain portion of the buffer to empty. The buffer may be a FIFO, for example. The advantage of having a pipelined command processor between a baseband processor and a multiformat master device is that the baseband processor does not need to wait until a command has been executed, but can continue operation immediately after issuing a command.

It should be noted that the multiformat communication protocol may enable a device to support $I^2C$ communication even if the multiformat protocol physical layer does not. Furthermore, the multiformat communication protocol may allow multiple $I^2C$ ports to be added at a later time if required by a system. The multiformat communication protocol may also enable simultaneous support of more than one communication protocol even if the device that uses the multiformat communication protocol does not have enough pins. This may be done by adding the extra needed pins to an external slave device. Therefore, even if the multiformat master device does not have enough pins to both support multiformat signaling and $I^2C$, the external slave device can submit the $I^2C$ messages on behalf of the multiformat master device using $I^2C$ command tunneling. Thus, the system is very scalable depending on requirements. In some cases multiple $I^2C$ interfaces may even be implemented in one or more slave devices, all controlled by a single master device.

In one example embodiment, the multiformat communication protocol may be used to send $I^2C$ messages one byte (referred to as an $I^2C$ byte) at a time and time by multiplexing these $I^2C$ bytes with other control information that is normally sent by the multiformat communication protocol. In other embodiments, the $I^2C$ messages may consist of a different number of bits than eight.

Alternatively, in another example embodiment, the multiformat communication protocol may be used to send $I^2C$ messages one bit (referred to as an $I^2C$ bit) at a time and time multiplexing these $I^2C$ bits with other data and information that is normally sent by the multiformat communication protocol.

The $I^2C$ message may be sent using a dedicated control channel or a general control channel scheme in a multiformat communication protocol frame. In other words, the data space or the control space of the multiformat communication protocol may be used to accomplish the tunneling of $I^2C$ commands. For example, for the dedicated control channel scheme, the $I^2C$ commands and $I^2C$ data are sent in the data space. Examples of this are shown in FIGS. 10A to 10D. For the general control channel scheme, I²C commands and I²C data are sent in the control space, which may have S, X and Y command fields that will be explained with respect to FIGS. 5D-5F. An example of the general control channel scheme is shown in FIGS. 9B-9D.

Figure 4:
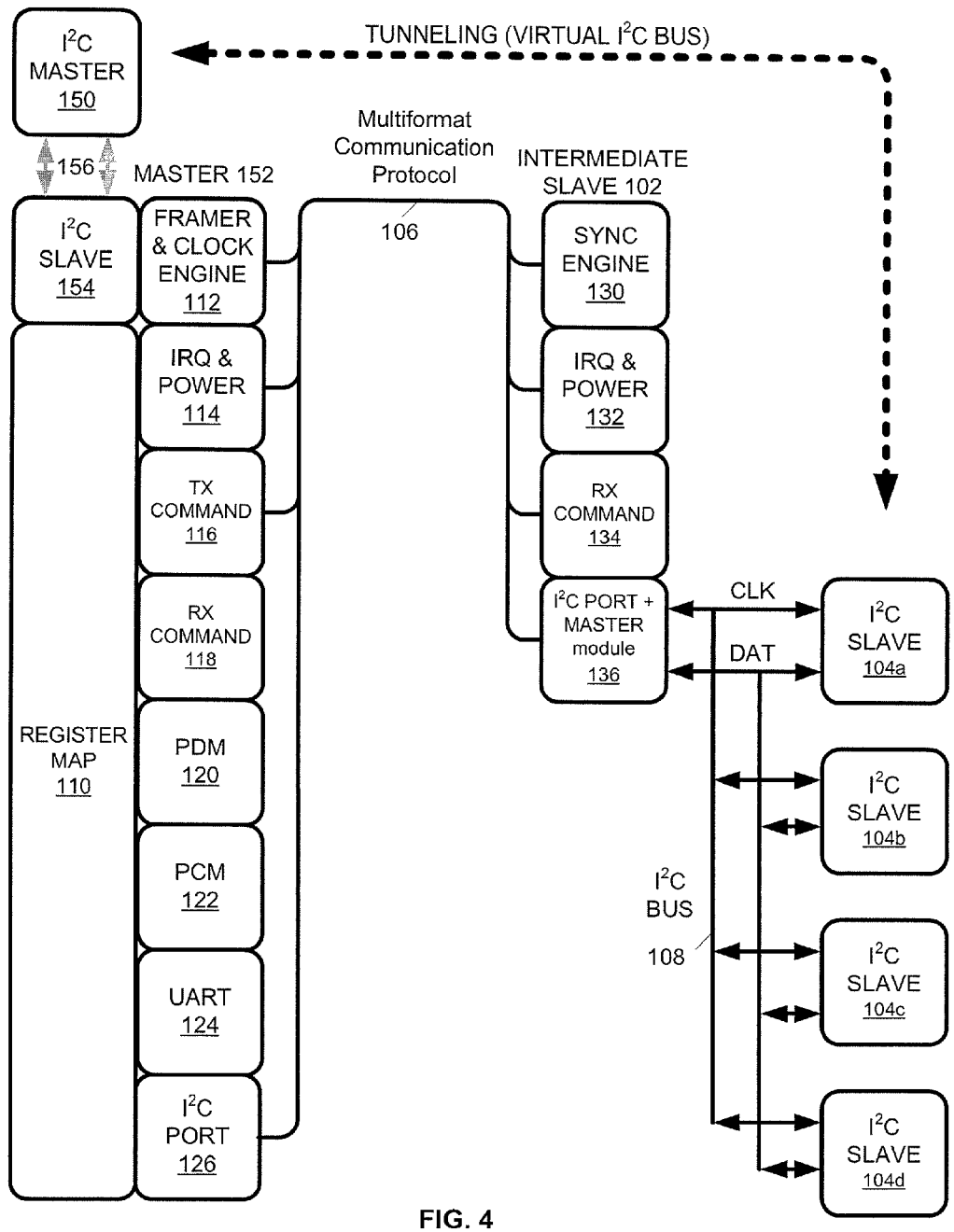
FIG. 4 is an example embodiment of an $I^2C$ master device that communicates with one or more $I^2C$ slave devices through an intermediate master device and an intermediate slave device that communicate according to the multiformat communication protocol.

The use of the dedicated control channel scheme or the general control channel scheme for transmitting I²C messages using the multiformat communication protocol may depend on how the various devices are coupled to one another. For example, if a master device is directly submitting commands to a port of a slave device, then the dedicated control channel scheme may be used as it should have enough bandwidth for I²C commands. As another example, if tunneling is to occur from a first device that communicates according to the I²C protocol to a second device that communicates using the multiformat communication protocol to a third device that communicates using the I²C protocol then the general control channel scheme may be used to realize lower latency (an example of this situation is shown in FIG. 4). In the example shown, a master is tunneling I²C messages over a multiformat communications bus to a slave device attached to the bus, but the communication may also be in the opposite direction or between two or more slave devices.

The transition between using different frame formats or bit allocations for facilitating I²C communication using the multiformat communication protocol versus communicating only with devices that support the multiformat communication protocol may be facilitated by using one or more I²C command ports that may be used to reformat I²C messages for transmission and reception according to the multiformat communication protocol format.

Referring now to FIG. 1, shown therein is a perspective view of an electronic device 10, which is a portable electronic device. In this example, the electronic device 10 is a cellular phone or a smart phone which is otherwise known as a mobile electronic device of a handheld device. It should be understood that the embodiments described herein are not limited to a phone but can be extended to any portable or non-portable electronic device that can benefit from using a multiformat communication protocol to send I²C messages either between internal components or to other devices that are coupled to the electronic device. Examples of such electronic devices generally include any portable electronic device such as wireless organizers, personal digital assistants, computers, laptops, handheld wireless communication devices, wireless enabled notebook computers, tablet computers or e-readers, electronic security devices, wireless Internet appliances, radios, TV's, electronic games, setup boxes, DVD players, Blu-ray players, stereo systems, home entertainment systems, cable television boxes, music players, TVs including HDTVs, car audio, beamforming audio (e.g. multichannel audio sound bars) and the like. The teachings herein are also applicable to non-portable electronic devices. Other examples are provided throughout this description. The electronic devices listed herein which are mobile are generally portable and thus are battery-powered and may have limited processing power and/or limited space, in which case it is beneficial to use a communication protocol that is more efficient as are various embodiments of the multiformat communication protocol described herein.

The electronic device 10 has a body 12 which includes a display screen 14, a keyboard/keypad 16, a set of buttons 18 and a user input device 20, such as a trackpad or a trackball. It will be understood that the user input device 20 is representative of a user-operated pointing or input device, which could also be presented as a joystick, a scroll wheel, a roller wheel, a mouse or a touchpad or the like. The electronic device 10 includes other elements that are not shown or described because they are well known to those skilled in the art. The electronic device 10 also includes at least one port 22 for receiving an electrical connector or a jack.

It should be noted that in at least some embodiments, the display screen 14 may be a touch screen that operates as an input device as well as an output device. It will be appreciated that there may be embodiments where the electronic device 10 may be a touch screen only device, i.e. with no keyboard or input device 20 and the touchscreen performs the operations of the keyboard 16 and the input device 20.

Figure 2:
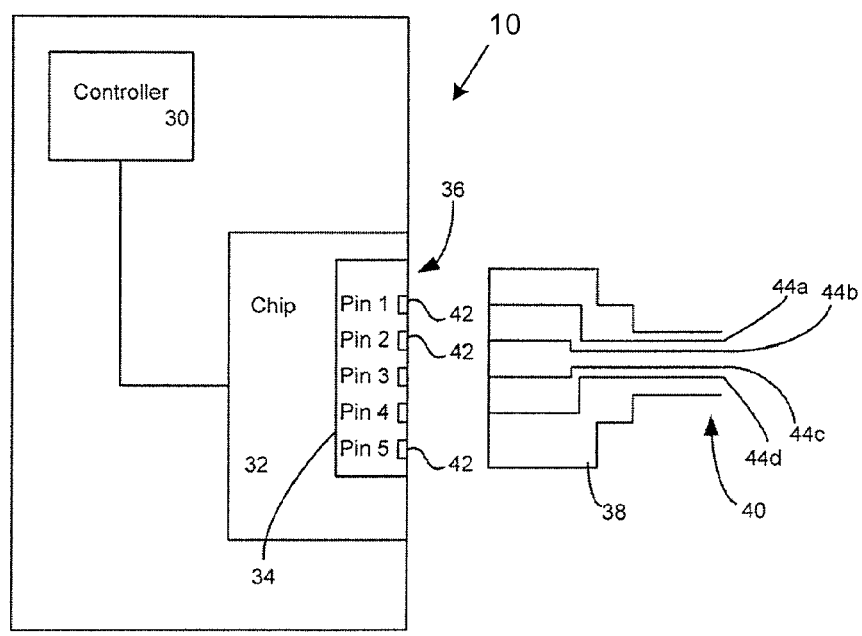
FIG. 2 is a block diagram of a portion of the internal components for the portable electronic device.

Referring now to FIG. 2, shown therein is a block diagram of a portion of the internal components of the electronic device 10. The electronic device 10 further includes a controller 30, which is connected to a chip 32, such as a headset or headphone interface chip, which is integrated within the electronic device 10. The controller 30 can be implemented using a processor or dedicated circuitry. The chip 32 may include a switch matrix and a jack configuration detect portion 34 which is integrated with a port 36 for receiving a jack 38 associated with a cable 40, such as a video cable or a headset cable. The switch matrix 34 includes a plurality of individual input and output ports 42 for receiving and transmitting signals with corresponding wires or lines 44a to 44d within the jack 38.

The wires 44a to 44d within the jack 38 represent signal lines, such as audio and/or video lines. The set of individual lines, of which there are typically four although other jack configurations with other number of wires may be used, allow for communication between the electronic device 10 and a device located at the other end of the cable 40, such as a headset, for example. In an example configuration, one line may be used for bus communication, a second line may be used for ground, a third line may be used for power and the last line may be used for other purposes such as a separate clock line, for transmission of video signals or for other functionality, for example. In this example, the headset interface chip may operate as the master device and the slave device may be a pair of headphones or a microphone that is coupled to the headset interface chip via the bus to which both of these elements are coupled.

Figure 3:
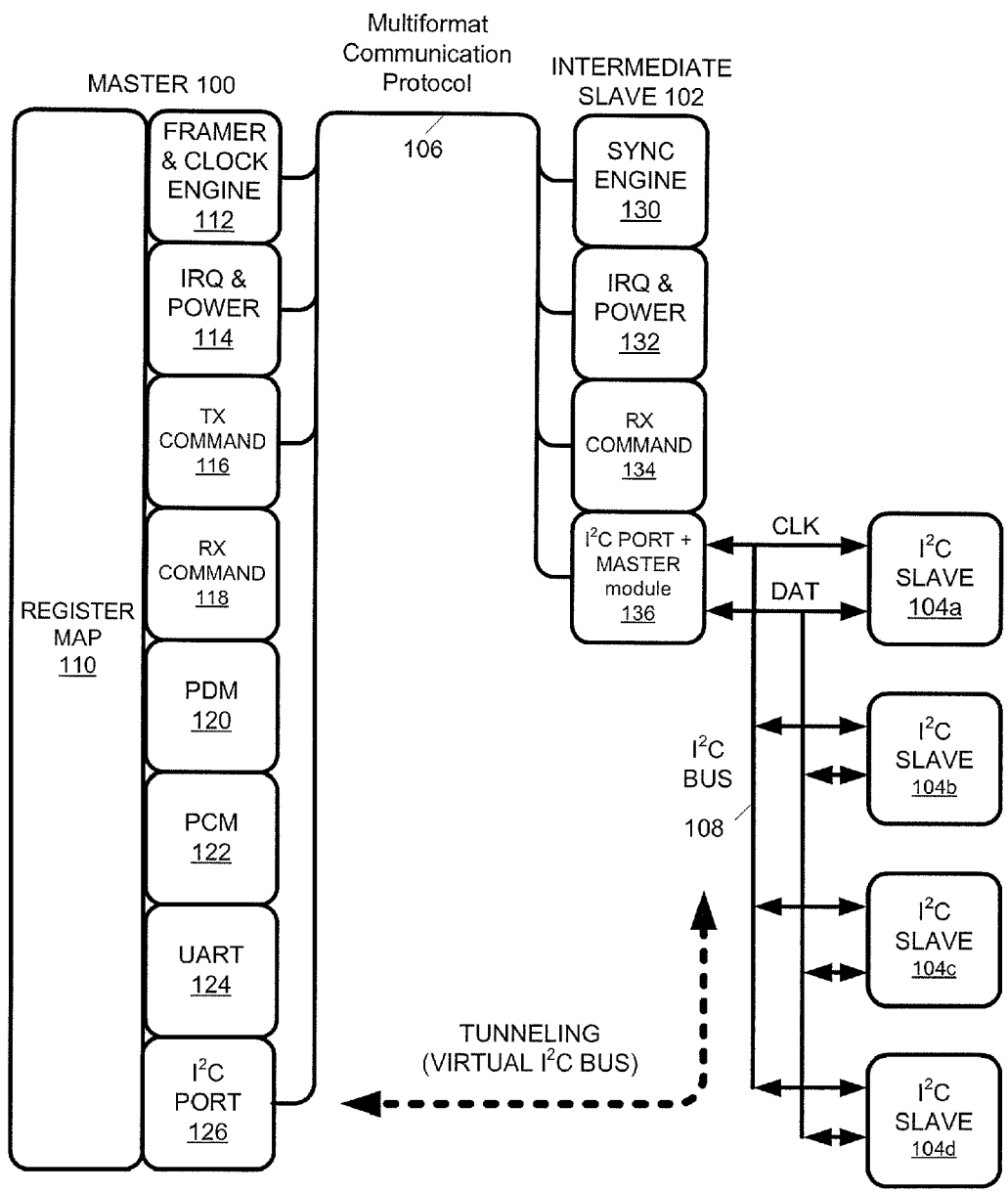
FIG. 3 is an example embodiment of a master device that communicates according to the multiformat communication protocol via an intermediate slave device 102 to one or more $I^2C$ slave devices.

Referring now to FIG. 3, shown therein is an example embodiment of a master device 100 that communicates according to the multiformat communication protocol via an intermediate slave device 102 to one or more I²C slave devices 104a to 104d. The master device 100 may be controlled by an internal state machine, through another control interface such as I²C or by a DSP, a microcontroller, a microprocessor or a baseband processor. In either case, the master device 100 executes a number of different operations that is determined by this controlling device (not shown). The slave devices 104a to 104d may be, but are not limited to, a microphone, a headset, a speaker, an Analog to Digital Converter (ADC), a Digital to Analog Converter (DAC), a display, an amplifier, a sensor, a radio module, a Bluetooth module, a modem, a switch and the like. The intermediate slave device 102 is physically coupled to the bus 106 and actively receiving synchronization information from the master device 100 but not necessarily in lock with the master device 100. If the intermediate slave device 102 is not in lock with the master device 100, it should not send out information on the bus, in order not to disturb the communication. In other embodiments, there can be more than one intermediate slave device 102 and a different number of I²C slave devices other than what is shown in FIG. 3.

In general, there may be master devices, slave devices and controllers. A master device controls a bus that the devices are attached to and use for communication. The master device is also is used to set up communication and monitors the devices that are attached to the bus. Slave devices have the ability to get in synchronization with a master device, to issue interrupts and to provide status information. Furthermore, it is possible for the master device to read and program slave registers inside a slave device. A controller is a special slave device that includes the ability to send out commands like a master device. However, a controller may first ask the master device 100 for permission to send out a command and is only permitted to send out commands a limited amount of time after which the control returns to the master device.

The multiformat communication scheme according to the teachings herein allow for communication between at least two devices, such as between a master device and a slave device, between two or more master devices such as between a master device and a controller, between two slave devices and between a master device and more than one slave device. The data communication between the devices generally utilizes a clock signal unless otherwise specified and the communication can be bi-directional unless otherwise specified. The clock signal is used to obtain timing information about when to sample or write during specific time slots. The clocking information is normally provided by the master but could also be provided by other devices.

In this example embodiment, only one intermediate slave device 102 is shown, but it should be understood that multiple slave devices may be coupled to the bus 106 for communication with the master device 100. Accordingly, the description provided herein for the intermediate slave device 102 may be applicable to other slave devices connected to the bus 106.

In this example embodiment, the master device 100 communicates with the intermediate slave device 102 via bus 106 using the multiformat communication protocol with a first frame format type. The intermediate slave device 102 then uses the multiformat communication protocol with a second frame format type to communicate with one of the I²C slave devices 104a to 104d via bus 108. With this configuration, any I²C slave device that is attached to the intermediate slave device 102 can be directly programmed by the master device 100. With this configuration, it will appear as if the I²C slave device that is being programmed by the master device 100 is directly attached to the I²C port 126 of the master device 100 even though the communication occurs through the intermediate slave device 102 using the multiformat communication protocol.

The master device 100 comprises a register map 110, a framer and clock engine 112, an IRQ and Power port 114, a transmit (TX) command port 116, a receive (RX) command port 118, a PDM port 120, a PCM port 122, a UART port 124 and an I²C port 126. The master device 100 may be controlled by a state machine or other controlling unit (not shown) and has additional memory elements that are not shown in FIG. 3. The intermediate slave device 102 comprises a sync engine 130, an IRQ and power port 132, a receive (RX) command port 134 and an I²C port+I²C master module 136. The intermediate slave device 102 and the slave devices 104a to 104d also have registers inside the slave devices themselves and inside the slave ports but they are not shown. The port numbers are generally fixed in hardware for a device. Audio or data streams associated with a specific port are device-specific. A channel assignment may be used to define which ports from the devices are assigned particular time slots on the bus 106.

Different components or interfaces may be used for the master device 100 and the slave device 102 in different embodiments and this embodiment is provided as an example only. For example, the PDM port 120 and the UART port 124 may be included if the master device 100 communicates with any slave devices that has similar ports. These ports may be included when the system requires this functionality. Otherwise, these ports may be excluded in other embodiments.

The register map 110 is a number of registers in memory that are used to implement the multiformat communication protocol by setting values for various parameters and setting up communication channels for the ports to support transferring data over a bus. Accordingly, specific registers are associated with each port to direct traffic to the correct data slots on the bus. The register map of any of the slave devices 102 and 104a to 104b may be programmed by the master device 100. The register map 110 of the master device 100 may be accessed by a master controller. The input to the master device 110 may come from processed wireless data, or as part of a DSP or through some other digital communication link such as PCM or I²S based channels or directly from some other processor.

The registers in the register map 110 may be grouped according to different types of operation such as Data, Setup, Activate channel and capability. A device may contain up to a certain number of ports, such as 14 for example. Isochronous and asynchronous data may be transferred through certain ports. Channel information in the register map 110 may be used to assign data slots on the bus. Channel assignment may be changed and depends on the system and use case. Channel assignment selects which ports from a particular device are assigned one or more particular time slots on the bus. Values for other parameters are also stored in the register map 110. These parameters include whether there is an Interrupt request, whether there is an I/O error or the IO is has been completed, the ID for a device, the number of rows or columns used in a frame, the clock setting and the like.

The framer and clock engine 112 may be implemented by hardware, such as a processor, a state machine or other dedicated circuitry, for example, that sends out clock and frame synchronization information for the time slots used for data transmission on the bus 106. Accordingly, the framer and clock engine 112 may be used to generate data and place the data in certain time slots on the bus 106 according to the frame format of the multiformat communication protocol that is being used.

In some embodiments, there may be a framer circuit that sends out frame synchronization information and a separate circuit will provide the clock information. In some instances the framer circuit may merely provide information about the start of every frame. The framer and clock engine 112 may be contained in other devices in other embodiments.

The various ports shown in FIG. 3 are used to transfer information between devices that are attached to the bus 106. Each port has a port number that may be given by a series of address bits in the register map 110 and contains a number of bytes of setup information, e.g. 16 bytes, some of which may be user defined. Each port may contains zero, one or more channels. These channels may be handled in a uniform manner by programming the port registers. For example, all channels from a port may be transferred using the same data and transfer format and the same sample rate. In some embodiments, it may also be possible to select which channels from a port are active and used to transfer information and what channels are not used. Channels that are not used will not consume bandwidth.

The IRQ and Power port 114 may be used to detect a PING request from a slave device attached to the bus 106 in the timeslot labelled IRQ in the various command fields shown herein, for example. The IRQ and Power port 114 may also be used by the master device 100 to issue power control commands such as a clock shutdown of the bus 106 or a power shutdown of some sections of the master device 100. The master device 100 or a slave device may wake up the bus 106 after a clock shutdown has been initiated, thereby restarting the bus 106.

The transmit (TX) command port 116 may be used by the master device 100 to transmit commands to the bus 106 since the master device 100 controls the bus 106. In some cases, it may be possible to attach a monitor device (it may be the same as a controller) to the bus 106, in which case while the monitor device would be similar to a slave device, it may also include a TX command port 116. However, the master device 100 may be configured to ignore requests from the monitor device to control the bus 106 or to allow it to access the bus 106. The commands issued by the TX command port 116 may typically be issued in the command space in a frame according to the multiformat communication protocol.

In some embodiments, the TX command port 116 may reverse the order of data and address bits received from and transmitted to the master device 100 to simplify software control in sending or receiving the LSB first instead of the MSB first, e.g. by using a small buffer and shifting bits out in the reverse order.

The receive (RX) command port 118 may be used to interpret commands on the bus 106. Examples of such commands may be an 8 bit READ operation, an 8 bit WRITE operation and a PING operation. The RX command port 118 may then tell the master device 100 if the slave device was attached during a PING operation, if the slave device responds to register read requests and to update the registers of the slave device based on WRITE operations (discussed later). In other words, the RX command port 118 may track the commands issued by the master device 100 and respond to these in an appropriate way.

The PDM port 120 may be used to transmit and receive Pulse Density Modulation (PDM) data, which is also known as a bitstream data and may be considered to be data similar to the output from a two-level delta-sigma modulator. The master device 100 may include separate input and output PDM ports in some embodiments with each of the ports having 8 channels, for example. The PDM data are normally isochronous.

The PCM port 122 may be used to transmit and receive Pulse Code Modulation (PCM) data which is in a serial format using encoded binary words to represent sample values. The PCM data may be isochronous or asynchronous. The master device 100 may include separate input and output PCM ports in some embodiments with each of the ports having up to 8 channels, for example.

The UART port 124 is a Universal Asynchronous Receiver Transmitter that may be used to control the transfer of asynchronous data between the master device 100 and another device by using appropriate buffering and control. The UART port 124 may be used for classical serial interfaces such as for a Bluetooth interface or a Bluetooth modem, for an FM receiver, for WiFi components (the utilized bandwidth may vary), for USB (variable bandwidth) communication, for touch pad sensors, for low data rate sensors, and for any component that has variable data input or output. The UART port typically may be associated with a FIFO structure in order to compensate for finite latencies in real time systems and systems that rely on two or more clock sources or includes asynchronous events.

Ports that communicate asynchronous data may include data synchronization bits to support arbitrary sample rates, e.g. 44.1 kHz PCM samples carried on a 48 kHz channel and asynchronous transfers with minimum hardware in the devices.

The $I^2C$ port 126 is used to transmit $I^2C$ messages using the multiformat communication protocol. For example, the $I^2C$ port 126 enables the master device 100 to send $I^2C$ commands such as $I^2C$ READ or $I^2C$ WRITE commands using the multiformat communication protocol. The $I^2C$ port 126 may use an $I^2C$ command port (see FIG. 7A) and associated bit patterns (see FIGS. 7B to 7C) along with different frame formats within the multiformat communication protocol (see FIGS. 9A to 9D) to transmit $I^2C$ messages to or to receive $I^2C$ messages from the intermediate slave device 102 while using the multiformat communication protocol. The operation of the $I^2C$ port 126 will be described in further detail with regards to FIGS. 7A-7C, 9A-9D and 10A-10D. The $I^2C$ port 126 may issue commands in the data space of a frame according to the multiformat communication protocol when a frame is modified for $I^2C$ communication (see FIGS. 10C-10D for example).

In order to compensate for slow devices at the receiving end, the master device 100 may slow down an $I^2C$ clock by employing clock stretching to compensate for the latencies at the receiving end. As an alternative, a NACK or ACK may also be used but the clock stretching will not affect the software reading from the $I^2C$ and is therefore a simpler method. Similarly, if the $I^2C$ slave device that receives commands from the master device 100 is not ready to act on them, then the $I^2C$ slave device may also stretch the clock. In other cases, a control signal may be used to indicate that the receiving end is not ready and/or commands may be reissued if needed from the transmitting end until the receiving has received or responded to the commands and/or data correctly.

Alternatively, if there is a long latency before the master device 100 is able to service the $I^2C$ link, then it may be advantageous to add buffering of incoming messages from the master device 100 for fast WRITE operations to an $I^2C$ device. Similarly, results from an $I^2C$ transaction may be stored in a buffer if a higher bandwidth is not available for reading this information. The buffering may occur before any messages enter the multiformat bus 106.

For the intermediate slave device 102, the sync engine 130 is configured to act as it would for a slave device according to the multiformat communication protocol. The sync engine 130 is used to synchronize the intermediate slave device 102 to the master device 100 by looking for certain synchronization symbols in the data transmitted on the bus 106. For example, the sync engine 130 may try to look for a constant sync symbol and a dynamic sync symbol during certain time slots. The sync engine 130 may also try to calculate values for the next dynamic sync symbol depending on the technique used for synchronization. An example operation of the sync engine 130 is described in U.S. patent application Ser. No. 13/784,457, entitled "Multiformat Digital Audio Interface", which is herein incorporated by reference, however, if this patent application conflicts with the present explicit disclosure then the present disclosure controls. The sync engine 130 may also be used to place the data in certain time slots on the bus 106 according to the frame format being used by the multiformat communication protocol for the bus 106. The sync engine 130 may be implemented in a somewhat similar fashion as the framer and clock engine 112.

The IRQ and power port 132 and the receive (RX) command port 134 operate in a somewhat similar fashion as the IRQ and power port 114 and the receive (RX) command port 118 respectively and will not be discussed further. Correct operation of the IRQ and power port 132 and RX command port 134 both relies on correct synchronization as obtained by the sync engine 130.

The I$^2$C port+I$^2$C master module 136 includes an I$^2$C port and an I$^2$C master module. Accordingly, the I$^2$C port+I$^2$C master module 136 provides the register interface to the bus 106 that communicates according to the multiformat communication protocol, and can provide some control signals and I$^2$C master device functionality. The I$^2$C port+master module 136 is able to retrieve the I$^2$C messages transmitted according to the multiformat communication protocol on the bus 106 and prepare the I$^2$C messages for transmission according to the I$^2$C communication protocol on the I$^2$C bus 108. In other words, regardless of whether the TX command module 116 or the I$^2$C port 126 transmits the I$^2$C messages or commands, the I$^2$C port+master module 136 is the portion of the intermediate slave device 102 that transmits and understands the I$^2$C messages or I$^2$C commands.

The I$^2$C master module may then send any I$^2$C messages received from the master device 100 out over the local I$^2$C bus 108. Likewise, any received I$^2$C messages from the I$^2$C bus 108 may be transferred back through the I$^2$C port+I$^2$C master module 136 for transmission according to the multiformat communication protocol back to the I$^2$C port 126. In this example embodiment, the dedicated control channel scheme may be used to transmit the I$^2$C messages using the multiformat communication protocol. The operation of the I$^2$C port+I$^2$C master module 136 will be described in further detail with regards to FIGS. 7A-7C, 9A-9D and 10A-10D.

Figure 10A:
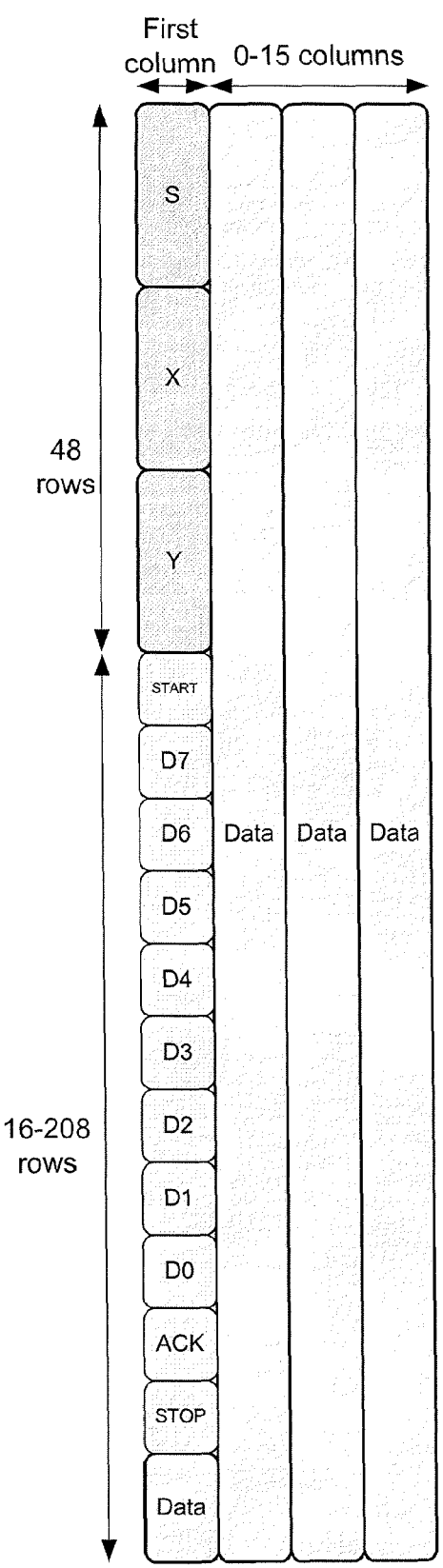
FIG. 10A is an example embodiment of a frame format for the multiformat communication protocol when sending $I^2C$ messages.

For example, FIGS. 10A to 10D show examples of the I$^2$C port 126 issuing commands in the data space, which are received by the I$^2$C port+I$^2$C master module 136. In this case, the command space (first column, first 48 rows in FIGS. 10A to 10D) may be used solely for other commands (e.g., READ/WRITE/PING) for the multiformat communication protocol, but not for I$^2$C commands or I$^2$C data. One advantage of using the frame format shown in FIGS. 10A to 10D is that no bandwidth is taken away from the command channel when communicating I$^2$C messages. However, a potential disadvantage is that the dedicated I$^2$C port 126 takes away bandwidth for the I$^2$C communication in the data space and this bandwidth may have been used to transfer other data under the multiformat communication protocol. In some cases, FIG. 10A may have another advantage, because it may not always be possible to use all rows below the first 48 rows in a frame format, for some clock/frame format configurations depending on the use case scenario for the multiformat communication protocol. Therefore, these otherwise empty cells may be used for I$^2$C messaging when the frame format of FIG. 10A is used.

In operation, a synchronization (sync) signal, control signals of information, data, a clock and possibly also power is transmitted between the master device 100 and the slave device 102 over the bus 106. Accordingly, the bus 106 allows for continuous operation of a number of external devices and all devices may be synchronized by the same clock signal. The clock signal can be used as a sampling clock for internal circuits such as sigma-delta converters or for continuous operation of a complex logic circuit. In other embodiments, there may be instances in which the clock signal is kept at a steady level such as static low logic level or a static high logic level to save power when there is no activity on the bus 106.

It should be noted that the I$^2$C port+I$^2$C master module 136 may submit an IRQ telling the master device 100 that something is not as it should be. The master device 100 may then check the registers of the I$^2$C port+I$^2$C master module 136 to see what the status is. The I$^2$C port+I$^2$C master module 136 may have a flag saying "buffer overflow" or "data ready" or some other situation. In these cases, the master device 100 is still fully in control.

In another scenario, the I$^2$C port+I$^2$C master module 136 may try to take over the bus 106 by using a BUS REQUEST. If the master device 100 grants control, the intermediate slave device 102 can issue one or more commands to set up I$^2$C communication. In some instances (not shown in the figures), the I$^2$C communication may happen between two slave devices, and not only between a master device and a slave device. In such an instance, it might be beneficial that the slave device 102 takes over the bus 106 for a short period of time. If the master device 100 will not grant access to the bus 106, then nothing should happen.

In some embodiments, monitoring the status of the I$^2$C bus 108 may be done through programming or extra functionality located inside the intermediate slave device 102. For example, the I$^2$C port+I$^2$C master module 136 may include a state machine that monitors the I$^2$C master module and sometimes requests commands to be issued (or the I$^2$C port 126 may do this). Then the I$^2$C master module inside the I$^2$C port+I$^2$C master module 136 may send and receive responses from I$^2$C slave devices 104a-104d. If something is wrong with the status, it could set an internal bit (IRQ) that would be read during the next PING operation. Similarly a state machine inside the I$^2$C port+I$^2$C master module 136 may check the I$^2$C bus 108 clock status, and if it is kept at a low level for too long time (e.g. in the case of an I$^2$C bus crash), it could set an IRQ bit inside the I$^2$C port+I$^2$C master module 136 that may be read during the next PING operation. The multiformat master device 100 would then know something (or exactly what) is wrong with the I$^2$C bus and may reset these devices (e.g. by power cycling).

Referring to FIG. 4, shown therein is an example embodiment of an I$^2$C master device 150 that communicates with one or more I$^2$C slave devices 104a to 104d through an intermediate master device 152 and an intermediate slave device 102 that communicate according to the multiformat communication protocol. In this configuration, any I$^2$C slave device that is attached to the intermediate slave device 102 will appear as though they are directly attached to the I$^2$C master device 150 even though the communication is facilitated by the multiformat communication protocol. Accordingly, the example embodiment shown in FIG. 4 enables I$^2$C to I$^2$C communication using the multiformat communication protocol thereby providing a virtual I$^2$C bus between the I$^2$C master device 150 and the I$^2$C slave devices 104a to 104d. In this example embodiment, the dedicated control channel scheme may be used to transmit the I$^2$C messages using the multiformat communication protocol. In other words, I$^2$C messages may be tunneled directly back and forth through the multiformat interface, thereby enabling I$^2$C slave devices 104a-104d to appear as if they were directly connected to the I$^2$C master device 150.

In this example embodiment, the master device 152 comprises the same elements as the master device 100 with the addition of an I$^2$C slave port 154 and an I$^2$C port 126 that operates a bit differently than the I$^2$C port 136, namely that I²C port 126 is used to convey the I²C messages over the bus 106 while the I²C port 136 receives and retransmits these messages to the I²C bus 108 using a regular I²C master interface, coupled to I²C bus 108.

The I²C slave port 154 is a conventional I²C slave device in the sense that it receives I²C messages from the I²C master device 150 through an I²C interface 156. In other embodiments, the multiformat master device 100 may not be controlled by an I²C master interface, neither will it be used to tunnel messages from such an I²C interface. Instead, the master device 100 may directly issue I²C commands using the I²C control port 126 and it may be controlled either by a state machine, a microprocessor or by some other suitable means.

In some implementations, the I²C port 126 may sense the I²C messages directly from the I²C master device 152 and send the I²C messages over to the I²C port+I²C master module 136, which then functions as previously described and sends these I²C messages as required to at least one of the I²C slave devices 104a to 104d via the I²C bus 108. In this case, the I²C port 126 may need to slow down the I²C clock from the I²C master device 152 by pulling the clock signal from the master device 152 down low until there is an acknowledgment received from the I²C port+I²C master module 136 that the intended I²C slave device recipients have replied that they received and correctly responded to the I²C messages.

Alternatively, in some implementations, the I²C port 126 may be programmed using discrete READ or WRITE operations and the I²C port 126 may send out a command once in a while. In this case, the I²C master device 152 checks the status of the I²C port 126 to see if the last command has been completed, what the result was and if the I²C port 126 is ready for the next transaction.

In some embodiments, the tunneling may utilize two or more I²C interfaces residing in one or more slave devices, controlled by one or more ports residing inside a master device. This may be used to reduce the power consumption of the I²C busses since some components may reside on a slow I²C bus while others may require more bandwidth and reside on a faster I²C bus. In other instances some components may be powered down while other components are functional in which case it may be advantageous to separate the I²C operation into two or more busses.

Figure 5:
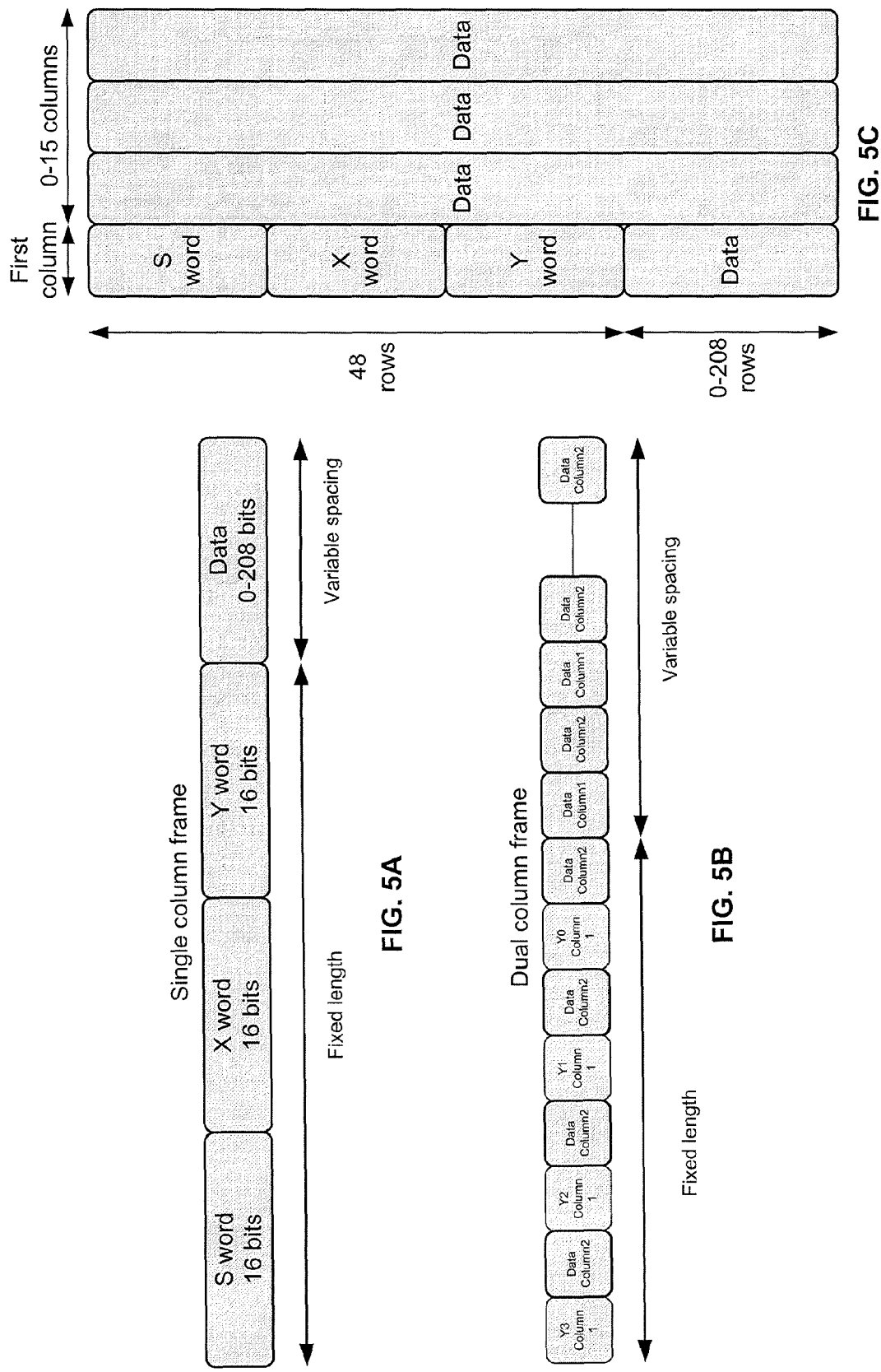
FIG. 5A is an example embodiment of a frame composition having a single column format for a multiformat communication protocol frame format.
FIG. 5B is an example embodiment of a frame composition having a dual column format for the multiformat communication protocol frame format.
FIG. 5C is an example embodiment of a frame composition having a multi-column format for the multiformat communication protocol frame format.
FIG. 5D is an example embodiment of an S synchronization field that may be used in the multiformat communication protocol.
FIG. 5E is an example embodiment of an X command field that may be used in the multiformat communication protocol.
FIG. 5F is an example embodiment of a Y command field that may be used in the multiformat communication protocol.

Referring now to FIGS. 5A to 5C, shown therein are example embodiments of various frame formats that can be used for the multiformat communication protocol including a single column format in FIG. 5A, a dual column format in FIG. 5B and a multi-column format in FIG. 5C. In general, a frame includes a control word and optionally other information. The control word may also be known as the control space. The frame is divided into a number of rows and columns. In an example embodiment, the minimum number of columns may be one, the minimum number of rows may be 48 and the maximum number of rows may be 256 and the number of columns may be any integer up to 16. This is generally shown in FIG. 5A which shows a single column (transposed to appear as a row for ease of illustration) that has a minimum of 48 bits and optionally a data field that may vary from 0 to 208 bits in this example. In some embodiments, the allowed number of columns may only be an even number.

Data in a frame format is transmitted by starting at the top left corner and then moving along the top row to the right to the end of the top row. At that point, the next data point transmitted is at the leftmost position on the second row. This pattern is repeated until the rightmost time slot associated with the bottom row. In this way, if data from different ports are transmitted along different columns, then this data is time-multiplexed.

The control word (also known as the control space or control field) may be situated in the first column, which may be referenced as column number zero, and consists of the following fields: a synchronization field (the S field) for synchronizing communication on the bus and two command fields (the X and the Y fields) for communicating control commands to the slave devices. It should be noted that these fields may be defined in other ways when I²C messages are sent using the multiformat communication protocol as will be discussed with respect to FIGS. 9B to 9D.

Data such as, but not limited to, audio and other information may be transferred in column zero below the control word as seen in FIG. 5A or in other columns as seen in FIGS. 5B and 5C. In order to unify the signaling of PDM and PCM data, both PDM and PCM data may be transported in the same way on the bus according to the multiformat communication protocol with the exception that PDM data is not transported in column zero due to the repetition rate of these packets. Bits from the control word can be interleaved with PDM and PCM data streams for low latency data transfers as may be done using the frame formats shown in FIGS. 5B and 5C.

The multiformat communication scheme according to the teachings herein may allow for a reduction in the number of wires that may be used for a bus or a reduction in the number of communication channels when using wireless or optical communication. Accordingly, the multiformat communication scheme according to the teachings herein may generally be implemented on a single wire bus or using a single communication channel or may be implemented on a multi-wire bus or using multiple communication channels.

For implementation in wireless communication, the wireless medium may be, but is not limited to, a magnetically coupled link or electromagnetic waves such as high frequency wireless transmission. Accordingly, in some embodiments the multiformat communication protocol described herein may be used with a digital key that has two terminals (i.e. two metal conductors) or using RF-ID wireless communications.

For implementation using at least one wire to conduct the information, the information may be transferred using direct logical signaling (totem pole or complementary outputs) or using topologies that allow multiple devices to signal simultaneously such as, but not limited to, open drain, open collector signaling or dynamic signaling types such as NRZI signaling combined with a bus holder or utilizing the bus capacitance.

In the single wire bus embodiment, after clock information is sent, a master device may be in tri-state (or drive weakly, e.g. open drain or open collector topology) during a number of subsequent time slots (after the clock information is sent) until the start of the next group of symbols. This allows both the master device and any slave devices attached to the single wire bus to write in subsequent time slots according to the multiformat communication protocol.

In some embodiments, some power may also be transmitted over a physical bus using the multiformat communication protocol by charging internal circuits with energy delivered during the signaling of information, e.g. a high voltage level may be used to simultaneously signal a logic high and at the same time charge an internal circuit in a slave to provide power. This scheme will work as long as the power consumption requirements are moderate or small for the devices. This scheme is described in more detail in U.S. patent application Ser. No. 13/784,457, entitled "Multiformat Digital Audio Interface".

In general, the data that is communicated using the multiformat communication protocol described herein includes synchronization data, control data, numeric data, and clock information. The numeric data can be audio data or measurement data such as current, voltage, temperature, pressure, and the like depending on the type of slave devices that are used.

The numeric data can be initially produced by a device in a bitstream format (i.e. PDM, pulse density modulated) or a digital word format (i.e. PCM, pulse-code modulation). Bitstreams may be used to transfer data in telecommunication and audio applications and as a storage format (e.g. on super audio CDs, SACD).

A digital word is a sequence of 0's and 1's having a certain resolution that is used to represent an analog value in a digital format. For example, a 16-bit digital word has 16 bits where each bit can be a 0 or a 1. Digital words, as discussed herein, are meant to cover binary-coded words such as twos complement or sign magnitude, and floating point words (i.e. unsigned or two's complement word), but could also be a compressed or encrypted version of digital data. The digital word can be produced using a method called Pulse Code Modulation (PCM) in which case the digital words are referred to as PCM words or audio words (for audio applications). PCM words are used for digital audio in a variety of devices including CDs, Blu-ray players, DVD players, computers, smart phones, laptops, tablets and the like.

The advantages of bitstream processing, such as low latency and fast transient response, can be maintained by avoiding the use of the digital word format. Therefore, an aspect of at least one embodiment of the multiformat communication protocol described herein is that bitstream data may be multiplexed in order to achieve the same latency for bitstream processing (i.e. one bit latency). When transmitting bitstream data, information may be transferred one bit at a time and may be multiplexed from different data channels instead of transferring all the data from each data channel one data channel at a time.

For example, in the case of bitstream data, data may be sent to or received from different ports of a device or from different devices that may be grouped together in a variety of different ways, as was described in U.S. patent application Ser. No. 13/784,457. The multiformat communication protocol described herein may be used for support of various applications such as, but not limited to, digital headsets and HDTV audio applications, for example.

In addition, control data, such as synchronization data and command data, can be converted to a bitstream format and embedded as part of the multiplexed data, which eliminates the use of an extra interface and also provides a robust programmable multiformat data interface.

The PCM words may be transferred in a single column (i.e. a single frame channel), as if the other columns (i.e. frame channels) did not exist or may be multiplexed directly with PDM data in one or more frame channels. For example, digital word data can be transmitted one bit a time with each bit being multiplexed with the bitstream data, which eliminates the use of a digital word data interface. In some embodiments, both PDM and PCM data may be transferred at the same time by multiplexing data streams from different transmitters. As an example, a system may contain two digital amplifiers that receive bitstream data and a connection to a Bluetooth or digital FM receiver or transmitter. The first slave devices (i.e. the amplifiers) may use bitstream data or multiplexed PCM data while the other devices may use multiplexed PCM data.

It should be noted that the term data channel as used herein generally refers to a channel that generates or receives data in a certain format. Accordingly, a word data channel is a channel that operates on digital word data and a bitstream data channel is a channel that operates on bitstream data.

It should also be noted that the term frame channel as used herein generally refers to channels of data in a frame in which the frame channels may be multiplexed in one or more columns and have certain time slots in a frame for transmission over a bus or other communication link.

It should be noted that bandwidth use can be improved by multiplexing data in various ways. This can be used for other types of applications other than audio applications in which there are differences in bandwidth of the various data. Multiplexing data can be accomplished by sharing a channel among multiple transmitters which results in a reduction in bandwidth use for each transmitter. This multiplexing may be implemented by using several counters and buffers.

Bandwidth control may also be extended to control the bandwidth of a control channel by using more than one channel for one transmitter. In other words, by sending out data from a transmitter more than once in the horizontal direction of a bitstream frame format (e.g. a frame that only transmits bitstreams that are multiplexed with one another), the bandwidth for the control frame channel can be reduced and therefore the bandwidth that is used for the transmission of control words is smaller.

The master device 100 sends out a command during every frame using the control word. The S word or S field consists of synchronization information that the intermediate slave device 102 may use to synchronize its timing to the master device 100. A controller may send also send out control commands (e.g. the X and Y command words or command fields) like the master device 100, but the master device 100 is usually the only device that sends out synchronization information.

In some example embodiments, in the frame formats for the multiformat communication protocol, the S field consists of a synchronization word composed of a nine bit constant sync word and a four bit pseudorandom counter value (also known as a dynamic sync word), two bits allocated for data integrity checking (PAR and ACK) and an interrupt bit (IRQS) as shown in FIG. 5D. In some embodiments, the slave device may also respond with a Not Acknowledge signal (i.e. NACK) to indicate an error condition. The constant sync word may be used by the slave devices attached to the bus 106 to quickly eliminate most false synchronization positions within a frame, while the dynamic sync word may be used to verify that a current position is indeed the start of a frame. This approach may be used to get a fast time-to-lock and to avoid slave devices locking onto false starts created by random static data on the bus 106. This is described in further detail in U.S. patent application Ser. No. 13/784,457.

The master device 100 can perform one of the following three control functions: status monitoring by using a PING command, register reading at one of the slave devices by using a READ command and register writing at one of the slave devices using a WRITE command. The type of operation is determined by the master device 100 and may be indicated by the first three bits of the X field in some example embodiments (as shown in FIG. 5E). These bits are followed by information given in the X and Y fields used by the PING, READ and WRITE operations. Example embodiments for the X and Y fields are shown in FIGS. 5E and 5F. In some embodiments, other commands may also be issued.

An interrupt (IRQ) bit may be included in every frame to try to achieve fast response to interrupt requests in many usage scenarios. Any device that is attached to the bus can signal an IRQ (on a PING request) in a frame by communicating during a time slot allocated for this purpose. With this scheme, the interrupt latency may be at most one frame. The master device 100 can choose to ignore this information or take action based on which device initiated the IRQ. Interrupts can be masked both inside devices attached to the bus 106 and inside the master device 100.

The master device 100 may send out PING commands in order to obtain back status information from all of the devices that are attached to the bus 106. In some embodiments, the PING operation may be the default operation and may be issued during every frame unless the master device 100 has received another command to issue for the frame. For example, device addresses zero to eleven may be monitored during the PING command in this example embodiment. The monitoring includes reading back the status levels of the devices attached to the bus 106 and includes mechanisms inside the master device 100 to automatically request attention when special events happen (e.g. when a device is first attached to the bus 106 or when the device is removed from the bus 106). In some embodiments, each slave device may have a status level between zero to three corresponding to the status messages: "not attached", "normal operation", "low level interrupt" and "high level interrupt". In other embodiments, a single level interrupt may be defined. Each slave device may send out status information in serial form and a total of 24 command bits may be allocated to transfer status information (e.g. two bits per device).

The READ and WRITE operations may be used to send information to or receive information from a single device that is attached to the bus 106. However, it is possible to issue broadcast commands that affect all devices that are attached to the bus 106 and group together commands or a selected group of devices that are attached to the bus 106.

In some example embodiments, there may be 4 device address bits, which can be used for device addresses. This might seem too restrictive since it is known that the seven bit address space used in I²C communication often results in address collisions. However, with the multiformat communication protocol, the actual device address may be dynamically assigned after power-up in a manner that guarantees that no address collision will occur, i.e. as long as at most 11 devices are attached to the bus 106 at the same time in this example embodiment. Eleven device addresses are mentioned here since device address zero may be used for wake-up and device addresses 12-15 may be reserved for group addressing, broadcast and the master device 100. An example of a dynamic address allocation scheme that may be used by the multiformat communication protocol to avoid address collision problems is described in U.S. patent application Ser. No. 13/784,457, entitled "Multiformat Digital Audio Interface". This scheme can handle components with the same part number and includes a scheme for a reduced gate count device ID.

The master device 100 can read information from registers inside a slave device by using a READ command in which the master device 100 indicates the slave device that will provide the information and the address at which the information can be found at the slave device. The slave device then responds with the relevant data and acknowledges a faultless transfer by setting an acknowledgment bit (ACK), which is the S0 bit (e.g. the first bit in the S field) in this example as shown in FIG. 5D. If the ACK bit is not set, the master device 100 will know that an error has occurred, which may be due to a data error or due to the requested register or device not being available, for example. In some embodiments, the ACK bit may be supplemented with a NACK bit (Not Acknowledgement) that will indicate when an error has occurred (e.g. bus collision, parity error, etc.). This extra control bit allows the master device 100 to distinguish between an error condition where a slave device detects an error and an error condition where the slave device is absent. The READ operation is described in more detail in the description of the X and Y command fields shown in FIGS. 5E and 5F, respectively.

The master device 100 may also write information to registers inside a slave device by using a WRITE command in which the master device 100 indicates the desired slave device and the address of a register at the slave device that will be written to and the information that is to be written to the register. The slave device then acknowledges a faultless transfer by setting the ACK bit. If the ACK bit is not set, then the master device 100 will know that an error has occurred due to a data error or the requested register or device not being available, for example. A slave device may also actively indicate an error by setting a Not Acknowledgement (NACK) bit. This means that the master device 100 can distinguish between an absent slave device and a slave device that has detected an error. The WRITE operation is described in more detail in the description of the X and Y command fields shown in FIGS. 5E and 5F, respectively.

During the READ and WRITE operations, the master device 100 writes the parity that it has calculated based on the current transaction. The parity bit can be either even or odd parity. The parity bit can be used by a slave device to determine if a single data error has occurred. Notice, due to the nature of the parity bit, multiple errors may go undetected. The slave device that the master device 100 is communicating with may also acknowledge that the transaction went well in this example embodiment. This approach for parity verification gives extra security since both parties (e.g. the master device 100 and the slave device) will know if the other party failed in receiving correct data. The master device 100 and any other device attached to the bus 106 may check the values they write to the bus 106. In some cases, error checking involving more than a parity bit may be included to protect against the condition of multiple errors.

If the value that is read back is not the same as the one written during a READ or a WRITE operation then a parity error may be reported. A bus error may be reported in the case of errors associated with data streams from ports. This scheme may detect most errors with one potential exception being the situation in which a device writes a certain value on the bus and reads back the same value, but another device reads a different value. This may happen if the value is in the illegal region between the low and high voltage levels used for signaling or if the setup and hold timing requirements are not met. In either case, it means the device or system does not follow the specifications. During special instances such as, but not limited to, dynamic address allocation and when the bus is released to a controller, it may be possible to read back a different value than what is written (e.g. a device writes a logical zero but reads back a logical one) without this constituting an error. In the worst case, where multiple devices can drive the bus 106 at the same time (e.g. IRQ/PING request) it is even possible to get a bus collision if two devices have read a different value in the previous time slot. In this case a physical bus collision is possible, but this would only happen if the specification requirements had been violated and would not persist for multiple time slots.

In this example embodiment, the master device 100 and the various slave devices may contain two memory bank registers which may be used to control the functionality of at least some aspects of the multiformat communication protocol. The master device 100 can select one of these memory bank registers during a READ or a WRITE operation. Only the selected memory bank register is active, and the non-selected memory bank register operates as a shadow register. This scheme enables instantaneous switching between two different configurations, e.g. two different audio schemes. For example, the master device 100 may select which memory bank is active using an internal CURRENT BANK register bit. This CURRENT BANK register bit may be copied onto the bus 106 during every PING frame in the Y command field in bit position BANK Y8 (see FIG. 5F). This allows all devices that are attached to the bus 106 to be updated at exactly the same instant to use the same memory bank register. This may therefore be used for seamless switching between different audio modes and may be used to affect all devices that are connected to the bus 106 when the transition takes place. This way all of the relevant control registers may be updated inside all of the slave devices at the same moment as requested by the master device 100. In other embodiments, the master device 100 may emit a broadcast command that tells all of the slave devices to change register bank or frame format and register bank simultaneously.

In some embodiments, the physical layer that is used to communicate on the bus 106 may include two terminals: a clock terminal and a data terminal. Information may be transferred on the data line using NRZI signaling, i.e. a logical one is transferred by changing the previous level on the bus 106 while a logical zero leaves the value unchanged. Devices that have not signaled on the bus 106 will rely on the level read back from the last time slot. Alternatively, other signaling schemes may be used, e.g. signaling based on a single wire combining clock and data an example of which is described in U.S. patent application Ser. No. 12/958,942, entitled "Single wire bus system", which is hereby incorporated by reference (if the '942 patent application conflicts with the present explicit disclosure then the present disclosure controls).

The last value on the bus 106 may be maintained by a bus holder that may be situated inside the master device 100. The clock may be controlled by the master device 100, while both the master device 100 and any other device attached to the bus 106 may signal on the data line. In some cases, the master device 100 may want to read back the value of the clock signal on the bus 106, in order to account for the finite time it takes to charge and discharge the clock line and thereby improve internal timing.

The data line may change on one edge of the clock signal. Alternatively, in other embodiments, the data line may change on both edges of the clock signal to enable higher bandwidth and lower power consumption. The lower power consumption is a result of enabling the transfer of more data using the same clock frequency. In other embodiments, multiple lanes (e.g. multiple data lines) may be used to increase the bandwidth. In this case, the I²C tunneling may happen on one or multiple lanes. The lower power consumption due to using multiple lanes is a result of increasing the bandwidth without needing to increase the clock frequency, thereby lowering the number of transitions used to transmit each bit.

In general, bus collisions are not possible even if two devices want to signal opposite logic levels at the same time (unless the timing and level specification violated in the previous time slot). When this condition happens (i.e. two devices want to signal opposite logical values in the same time slot, e.g. during an IRQ/PING request), with the signaling scheme that is used, the value on the bus 106 will be determined by the device signaling a logical one and thereby inverting the last level written to the bus 106. The device that writes a logical zero will not affect the bus 160 and this device will merely tri-state its output. The bus holder will maintain the previous value unless a device wants to write a logical one to the bus 106.

In some instances, the master device 100 may be attached to more than one bus (not shown) or in other words the master device 100 may be attached to more than one bus system or to multiple data lanes. This scheme may be chosen to minimize power consumption. If this is used, each bus system or each data lane may work using the same register map, except with a different offset between the start of each set of registers. The physical layer is further described in U.S. patent application Ser. No. 13/784,457, entitled "Multiformat Digital Audio Interface". An alternate physical layer is described in U.S. patent application Ser. No. 12/958,942, entitled "Single Wire Bus System". Another example for transmitting clock and data on to achieve a higher bandwidth is described in U.S. patent application Ser. No. 14/021,371, entitled "High bandwidth multichannel single wire interface". U.S. patent application Ser. No. 14/021,371 is hereby incorporated by reference, however, if the '371 patent application conflicts with the present explicit disclosure then the present disclosure controls.

The multiformat communication protocol is capable of simultaneously transporting PCM and PDM data. The protocol allows both kinds of data to be controlled by the same register set and to be freely intermixed. For example, data on the bus 106 may be multiplexed between different sources on a bit to bit basis. This scheme enables simultaneous support of PDM and PCM sources with low latency. With reference to FIG. 5C, when transporting information, a bit from the command column may be transferred first followed by a bit from the second column in the same row, followed by a bit from the third column, etc. until the end of the row has been reached and the next row below is chosen. In order to simplify clocking requirements, the number of columns divided by the number of samples transmitted by one channel within one row may be an integer for PDM streams. Furthermore, the number of time slots (the product of the number of columns and rows of a frame) within a frame divided by the number of samples transmitted by a channel within a frame may be an integer (unless asynchronous PCM mode is used) to simplify clock requirements. In some configurations, the number of columns may be limited to an even number to simplify clocking and system requirements further (this way the first column containing the commands always starts on the same clock edge).

For example, in some embodiments, each selected channel from a PDM port may be transmitted one bit at a time, starting with one bit from the lowest numbered channel and first port that has been selected, then one bit from the second lowest channel that has been selected, and so on and so forth. When all channels have transmitted one bit the next port is selected and when all ports have completed transfers, the first selected channel from the first selected port will start transmitting another bit. Bits are transferred one row at a time, starting with the leftmost bit at the top of the frame shown in FIG. 5C. When a port has transmitted a word from all channels, the procedure will start over. Horizontal and Vertical start parameters may be used to define the start of data from a port and enable control of when data starts with respect to the command words in the frame. The bandwidth used may be controlled using a vertical spacing parameter and a horizontal spacing parameter which may change the spacing between the bits in both the row space and the column space. In other embodiments, other forms of encoding the transfer pattern may be used. More details can be found in U.S. patent application Ser. No. 13/784,457, entitled "Multiformat Digital Audio Interface".

Referring now to FIG. 5D, shown therein is an example embodiment of an S synchronization field that may be used in the multiformat communication protocol. The S synchronization field includes an error control sub-field having bits S15 (IRQS) and S14 (PAR), a constant sync symbol sub-field having bits S5 to S13, a dynamic sync symbol sub-field having bits S4 to S1 and an error control sub-field ACK.

The purpose of the IRQS (or PING request) bit is to signal an interrupt to the master device 100 bus master during any frame. A slave device may copy the contents of the MSB (Most Significant Bit) of its status register onto the bus 106 during the IRQS time slot. There is no difference between one or several devices signaling at the same time during the IRQS time slot because the bus 106 uses NRZI signaling in this example embodiment. In other words, if two devices try to signal a logical zero and a third device tries to signal a logical one during the interrupt (i.e. during the PING request) time slot, the winning device will be the device signaling a logical one and the interrupt request is seen by the master device 100. Based on the value of this bit, a pending READ or WRITE operation may be postponed for quick response to the interrupt. If no slave device has activated this bit (V means activate) or if the IRQS interrupt is disabled then a pending READ or WRITE operation may proceed immediately. The delay is activated, if the slave device has a status level equal to "10" or "11", i.e. if the slave device requests attention. Also, any pending READ or WRITE operations may be postponed until the status level of the slave device has been obtained using a PING operation. The master device 100 may also enable the IRQS interrupt, but choose to ignore or delay serving the pending interrupt depending on the operational mode that it is in.

In some embodiments, the IRQS bit may also be used to wake up the bus 106 during low power shutdown. In this case, the bus 106 may shutdown just when the signaling of the IRQS is about to start. The clock signal will be left in the low state and any changes in the data line will resume the clock signal. In this case, the data line may be driven until the clock signal has changed state. In some cases, the data line may deliberately be left in the low state before clock shutdown in order to avoid any devices having to remember the last state before the clock shutdown happened. It should be noted that this will reduce any input leakage currents because the clock and data lines are set in the low state. This enables devices to be completely shut down and may be used to remove power during some or all of the clock shutdown phase in some cases.

The constant sync symbol sub-field spans bits S13 to S5 and may be used to obtain fast initial synchronization on random bus data by a slave device. A constant word may be selected that is not expected to be often encountered in the other data that is transmitted on the bus 106. An example of a constant sync symbol that may be used is "101100011".

Still, there is a finite probability that random bus traffic will match the chosen sync symbol. Therefore, another mechanism of synchronization may be used that protects against random static data (e.g. from a temperature sensor) resulting in false synchronization, namely the dynamic nature of the synchronization field. The dynamic sync symbol sub-field spans bits S4 to S1 and may be generated to be quasi-random by a suitable sync generator such as but not limited to a CRC generator. For example, bits S4 to S1 of the dynamic sync symbol may be determined according to: {S4, S3, S2, S1}={S3, S2, S1, (S4 XOR S3)}. The sync generator shall be initialized to "1111" at reset. The "0000" state is not allowed (since this would result in the state machine getting stuck at all zeros) and may result in the "1111" state during the next cycle if it is ever encountered. A slave device may wait until it has verified the entire sync generator cycle before allowing it to communicate on the bus 106 (i.e. in this example it may take a slave device at least 15 frames to lock on to the bus 106). The slave device may also verify that the distance between the valid sync symbols is constant and equal to a finite allowed number of values, thereby indicating to be within the allowed range of rows.

The error control sub-field ACK may also be referred to as the RESPONSE sub-field at bit S0. This bit is calculated based on bus traffic in the last frame. Slave devices that are addressed during READ and WRITE operations may acknowledge a successful transfer by activating the RESPONSE bit. A slave device may signal logic high if the calculated parity during a READ or WRITE operation to this device matches the value written by the master device 100. The slave device sets the RESPONSE bit, since it is the only device that knows if an error has occurred, e.g. that the parity bit is wrong or a bus error has occurred. If no slave device is present at the specific device address, a logic low may be returned from the bus 106 indicating a problem to the master device 100, i.e. if the master device 100 sees no response, it knows that no device has received the message or some other error has happened.

If no specific device is addressed during a PING operation, for example, then devices that detect a bus error may use the RESPONSE bit to signal this condition. Any slave device that has detected an error based on the parity bit and the entire activity of the past frame may activate the RESPONSE bit (i.e. write a logic one). If a missing RESPONSE error is detected by the master device 100 during a READ or WRITE operation, the master device 100 may activate an IO ERROR bit in the register map 110. If the master device 100 sees a non-expected response from a PING operation then the master device 100 may activate a BUS ERROR bit in the register map 110. In other embodiments, the ACK bit may be used solely as acknowledgement and a separate NACK bit may be used to signal error conditions. In this case, there may be no difference in interpreting the response from the ACK and NACK bits regardless of whether the READ, WRITE or PING command is used.

If there is no error in parity, the device that was addressed in the previous frame will respond with an ACK equal to logical 1 (i.e. active action). This is useful for added security during IO writes. If there is a parity error, the following actions may take place: during a WRITE operation from the master device 100 to a slave device, the slave device should not complete the WRITE operation internally, if there is a parity error and may signal a NACK. The master device 100 may respond to the bus controller with an IO ERROR interrupt. During a read from a slave device, the master device 100 will generate an IO ERROR IRQ, while the slave device will not do anything if it signals a NACK to the master device 100. By reading the device register and the last written word, it may be possible to identify which READ or WRITE operation was at fault and thereby identify the relevant device. Before performing a new READ or WRITE operation it is advised to wait until the current IO operation is complete and to check the status of the past operation e.g. using an IO ERROR bit. By using this methodology, most errors may be corrected fully.

A NACK may be raised during a PING operation if a parity error is detected in a previous frame, in which case the devices attached to the bus 106 will respond with a logical one. This may allow multiple devices to respond at the same time since the bus 106, both for one-wire and two-wire implementations, allows for wired-or functionality. In other embodiments, any device may signal a NACK during the same frame as it occurred to give immediate feedback to the master device 100 (see FIG. 9A, for example).

Referring now to FIG. 5E, shown therein is an example embodiment of an X command field that may be used in the multiformat communication protocol. The structure of the X command field depends on what operation is currently under way. The table in FIG. 5E gives example embodiments of several combinations. In these examples, the first three command bits (X15-X13) indicate what command is being issued by the master device 100 while the structure of the remaining bits may depend on the command chosen. The X command field generally comprises a frame type sub-field (X15-X13), a device address sub-field (X12-X9) during READ and WRITE operations, a BANK sub-field (X8), a Frame Sync sub-field (X10) (which may also be referred to as FS or FRA SYN herein) during PING operations, a Reserved sub-field (X10) during PING operations that is reserved for future operations and can be ignored for now, a Request Bus sub-field (X12) (which may also be referred to as BUS REQ herein) during PING operations, a Release Bus sub-field (X11) (which may also be referred to as BUS REL herein) during PING operations, a register address sub-field (X8-X0) during READ and WRITE operations and a status device sub-field (X11-X0) during PING operations. Other embodiments may use different sub-fields or a different arrangement of sub-fields or a different number of bits for the sub-fields, see FIG. 9A, for example.

The frame type sub-field (X15-X13) may be used to indicate the current command that is being issued to slave devices that are attached to the bus 106. The command may be an eight bit READ or WRITE operation or a PING operation. The PING command is the default command, unless the master device 100 will be performing a READ or WRITE command. In some embodiments, other operations or data lengths than 8 bits may be used.

The BANK sub-field (X8) may be used to signify the audio register bank that is currently being selected by the master device 100. The BANK sub-field may be used to switch between two or more register banks to avoid any glitches during playback while changing audio modes. In this example embodiment, the BANK switch changes between two register selection, each bank may contain a fixed configuration or be selected from multiple configurations using other register selections. If multiple (more than two) register banks are used, other registers may be needed to indicate which bank is being used.

During every PING frame, the master device 100 indicates which register bank all devices should use for audio transfers, internal timing etc. by copying the master internal CURRENT BANK bit from the register map 110 onto the BANK X12 time slot. In some embodiments, due to the possibility of large consequences of reading a single false BANK bit during a PING operation, this bit may be read several times, such as at least two times for example, to ensure that it has the same value, before a change is accepted. In other words, a change of mode of operation will take place after two consecutive PING frames with the same BANK X12 value before it is adopted. The CURRENT BANK bit may be used to seamlessly change between two operation modes with no glitches in audio output. During frames that do not use the PING operation, the CURRENT BANK bit may be used to select a register bank for different frame operations. In other embodiments, a broadcast WRITE operation may be used to get all slave devices to change configuration at the same time.

The slave that is being addressed may use the BANK X12 bit to select which register bank to perform a READ or a WRITE operation. The slave device may use a shadow register for all registers that change in the two audio modes. The slave device determines how the internal memory is organized and how the selection between the two banks is organized. It may be used to select between internal registers and/or internal programs. In some embodiments, the bank selection bit inside a slave device or the master device 100 may point to two vectors that each point to an individual register selection; these scheme may allow for multiple (i.e. more than two) register banks to be used.

The Device Address sub-field (X12-X9) during a READ or WRITE operation may be used to indicate the address of a slave device that is attached to the bus 106. All slave devices start to communicate at device address zero after power-up after which they will be assigned a new address by the master device 100. Device address zero is reserved to signal attachment to the bus 106 at startup. Device addresses one to 11 may be used for slave devices that are attached to the bus 106. The Device address 14 may be reserved for the master device and for groups of devices. Devices with a device address of 0-11 may communicate full status information to the master device 100. Devices with a device address of 12-14 may request attention from the master device 100 by utilizing the S15 IRQS bit. Addresses 12-14 may be used to program several devices simultaneously using a SUBGROUP function. All devices in the chosen group can be set up using WRITE operations to the group. Device address 15 may be reserved for broadcast of information. This way all devices will be updated at the same time. The first transmitted bit is the MSB.

The FRAME SYNC sub-field (X10) may be used during a PING operation to synchronize PCM channels that are transferred at a lower sample rate than the frame rate. In some embodiments, the FRAME SYNC sub-field may be set to high at the start of a sequence of valid data and may serve as the start reference for data locked to multiple frames instead of the start of a single frame.

The REQUEST BUS sub-field (X12) may be used by a controller during a PING operation to request access to the X and Y command fields of the bus 106. The REQUEST BUS sub-field may be copied to the register map 110 of the master device 100 during every PING frame and may result in an external IRQ from the master device 100. The interrupt may be masked by other bits in the register map 110 of the master device 100. The master device 100 may allow the controller to modify the X and Y command fields by enabling an internal bit in the master register map 110 called the ENABLE EXTERN CONTROL bit. This bit may then be copied to release the RELEASE BUS sub-field (X8) during a PING operation and the controller may then modify the X and Y command fields in the next frame. If the master device 100 chooses to send out a command during the next frame, the device that loses arbitration (i.e. signaled by reading back a different bit than written) may back off and try again later. If implemented this way, multiple controllers can signal at the same time as the master device 100. In other configurations, the master device 100 or a controller may release the bus 106 for a finite number of frames. This feature may be used for multi-master, test and debug purposes.

The RELEASE BUS sub-field (X11) (logic zero when active, inverted logic) may be activated by the master device 100 during a PING operation in which case a controller may then be allowed to begin to send out X and Y command fields to the bus 106 in the next frame following the PING command. However, the master device 100 may simultaneously send out commands, if it chooses to do so. Data arbitration may be used to determine who wins to request a specific command if two devices send out a command at the same time. In this case, the device sending out the command with the numerically largest value will win the arbitration (i.e. if a controller tries to write a zero but reads back a one, it may abort the current command and retry the same command the next time this is allowed). If a controller begins to write in the X and Y command fields even when the RELEASE BUS sub-field is inactive during a PING operation, then this may constitute a bus error.

The REGISTER ADDRESS sub-field (X8-X0) and (Y15-Y0) during READ and WRITE operations may consist of a BANK bit, a 16 bit address and 8 bits of data (READ8 and WRITE8) or a BANK bit, an 8 bit address and 16 bits of data (READ16 and WRITE16). In some configurations, the two register banks are not selected directly from a dedicated BANK bit during the READ and WRITE operations, but may be selected from choosing certain regions of the register map that belongs to two different memory selections. Some register selections may not even be switchable by the BANK bit. The interpretation of this field depends on the type of operation. When the READ16 (16 bit read) and WRITE16 (16 bit write) operations are used, this register contains the entire address of the register being read or written to. When the READ8 and WRITE8 operations are used, the address for the register being read or written to is the lower eight bit address of a 16 bit address. The least significant bit may be transmitted first. During READ8 (8 bit read) and WRITE8 (8 bit write) operations, devices that have 128 or fewer addresses may assume the last bit is zero without reading it. This will give the device one extra clock cycle to respond with the resulting 16 bit data, if the addresses are transmitted in reverse order.

The STATUS DEVICE sub-field (X11-X0) during PING operations reflects the value of status registers at the devices that are attached to the bus 106. The status register may consist of two bits. The value of the status register is used to determine which action the master device 100 should take. Each device responds with status information by writing to dedicated time slots that are allocated for each device. In other words, one can consider this as an example of polled interrupt signaling. The total number of status bits is 24 and the slave devices transmit the most significant status bit first. The status bits may generate a master interrupt depending on the value of an interrupt mask bit. After power-on reset, all slave devices or controllers may start responding at slave address zero to signal that these devices have been attached to the bus 106.

Referring now to FIG. 5F, shown therein is an example embodiment of a Y command field that may be used in the multiformat communication protocol. The structure of the Y command field will depend on what operation is currently under way. The STATUS DEVICE sub-field (Y15-Y10 and Y7-Y0) during a PING operation behaves similarly to the STATUS DEVICE sub-field described for the X command field during a PING operation. The ADDRESS 6-0 sub-field (Y15-Y9) may be used during READ8 and WRITE8 operations to define the upper eight bit of a 16 bit address. The least significant bit (bit 8) may be transmitted first. If a slave device register has less than 32 kbytes of memory, the last bit (the MSB, Y8) may be assumed to be zero. This will give slave devices one more clock cycle to respond with register information and thereby support slower memory.

Referring now to FIG. 6, shown therein is an example of transmitting data using the I$^2$C communication protocol. Some elements of the I$^2$C communication protocol will now be discussed in order to better understand how the frame format of the multiformat communication protocol may be altered to support I$^2$C messaging.

Conventionally, the I$^2$C communication protocol allows an I$^2$C master device to communicate with one or more I$^2$C slave devices. The example I$^2$C communication shown in FIG. 6 will now be described. An I$^2$C communication typically happens by first starting a transaction at the I$^2$C master device by sending a START bit followed by one I$^2$C byte (having bits D7 to D0) to an I$^2$C slave device. The I$^2$C slave device will then set an ACK (i.e. acknowledge) bit if the transaction was successful, i.e. the I$^2$C slave device correctly received the I$^2$C byte without any errors. However, in some cases the I$^2$C master device may set the ACK bit to show that the I$^2$C transaction was successful, e.g. on multiple READ operations. The I$^2$C ACK bit that is used may be the last ACK bit in a frame from the multiformat signaling. If the transaction was not completed successfully then the NACK (i.e. not acknowledge bit) may be set by the I$^2$C slave device or the I$^2$C master device by not signaling ACK or using a dedicated NACK bit in the multiformat communication protocol. It should be noted that the I$^2$C master will terminate a multi-read sequence using the NACK bit to tell the I$^2$C slave device the reading sequence is over. When an I$^2$C transaction is completed, a STOP bit is sent. It should be noted that in some embodiments, the STOP bit may be defined by the multiformat communication protocol before the next I$^2$C transaction is transmitted so that the I$^2$C transaction completes in same frame, see FIG. 9B, for example. This may give extra latency for the external I$^2$C device (104*a-d*) to complete its transaction and thereby may be used to avoid having to insert empty frames on the bus to accommodate devices having different speeds.

Again turning to the example in FIG. 6, in order for these I$^2$C messages to be transmitted according to the multiformat communication protocol, the following events would be communicated in a frame:

1. a START bit (or a RESTART bit) which is the same encoding, signifies the start of an I$^2$C message and uses one bit;
2. the I$^2$C DATA, which is eight bits of information and if it is the first byte in an I$^2$C message, the first seven bits will represent the slave device address and the last bit will indicate whether a READ or a WRITE operation noted as r/w is being done;
3. an ACK bit sent by the I$^2$C master device or the I$^2$C slave device; and
4. a STOP bit.

This is a total of 11 bits. In some cases, these 11 bits may be compressed into 10 bits, namely in the case where there is no need to restart a transmission immediately after one transmission that was only one byte long. Accordingly, for the general technique 11 bits may be used. However, for the compressed technique 10 bits may be used as will be described with respect to FIG. 7E. It should be noted that the START and STOP bits may be inactive during some messages but the ACK bit or the NACK bit (when used) may be active for all messages.

While the example in FIG. 6 is a fairly simple example, it is known that there can be I²C READ or WRITE operations in which a different sequence of I²C messages are sent on an I²C bus. Examples of these I²C READ and WRITE operations and how they may be sent using the multiformat communication protocol will be described in FIGS. 8A-8D. However, in order to use the multiformat communication protocol for I²C communication some special registers and control bits for a command port may be used, an example of which is shown in FIGS. 7A-7D. This command port may be used for the I²C ports 126 and 136 from FIGS. 3 and 4.

Referring now to FIG. 7A, shown therein is an example of using address bits as status bits for an I²C command port that can be used to communicate I²C messages using the multiformat communication protocol. By reading or writing to different addresses then different functions may be initiated. The port field is part of the address. A port can be considered to be the entry or exit point for accessing the data space within a frame. See U.S. patent application Ser. No. 13/784,457, entitled "Multiformat Digital Audio Interface", for examples on using ports.

The I²C command port may be used to perform register I²C READ and WRITE operations. The I²C command port has the function of transferring 8 and 16 bit quantities to and from an I²C bus. A 16 bit quantity can be supported by using a new operational code or using the data space to contain the 16 bit quantity. Since the I²C communication protocol is normally slower than the multiformat communication protocol described herein, a procedure according to the teachings herein may be used to enable READ operations from an I²C bus without inducing unnecessary delays. For example, this may be done by preparing the I²C command port for an upcoming 8 bit READ operation or in some alternative embodiments for an upcoming 16 bit READ operation. The transfer of the I²C data will happen during the next frame and the I²C bus will also be ready for the next I²C register READ operation. In other words, the I²C port 124 inside the master device 100 may request the I²C master module 136 residing inside the multiformat (i.e. intermediate) slave device 102 to initiate a READ operation in one frame, but in that same frame request that the actual I²C data be sent in the subsequent or next frame to avoid waiting for the I²C data. It should be noted that I²C WRITE operations are simpler since the I²C command port may be updated afterwards and the I²C data transferred to the I²C device later. If the I²C slave device does not accept the I²C data, then the I²C control port 126 needs to know this (either in the same frame or a later frame by using a missing ACK bit, a dedicated NACK bit or by later using an IRQ bit).

In this example embodiment, the I²C command port comprises a PORT field (bits B7-B4), a RESERVED field (bit B3), a START field (bit B2) and a NEXT transaction field (B1-B0). In order to minimize the number of I²C transactions that are used for an I²C communication, the port field address may be used to define certain operations and the START and NEXT transaction fields may be used to control the operation of the I²C command port.

The START bit (B2) may be used to define the START and STOP conditions as defined by the I²C protocol and shown in the example given in FIG. 6. In this case, since only one bit is used for both of these conditions, the previous value of the START bit (B2) may be used to determine the I²C sequence that is currently being sent on the I²C bus. Some I²C sequences are defined in the example embodiment shown in FIG. 7B.

Referring now to the table shown in FIG. 7B, it can be seen that the default value of the START bit (B2) is zero. The value of the START bit (B2) is compared to its value from the previous frame to define I²C activity for the current frame. In this example, one I²C command is tunneled out per frame using the multiformat communication protocol.

For example, if the value of the START bit (B2) in the previous frame (referred to here as Previous START) was zero and the value of the START bit (B2) in the current frame (referred to as Current START) is zero then there is no activity on the I²C bus and it is idle.

However, if the value for the Previous START bit (B2) was zero and the value for the Current START bit (B2) is one, then this indicates that there will be activity on the I²C bus and that the I²C bus should be activated and I²C data should be transferred in the current frame. This is analogous to the first nine bits being transmitted in the example shown in FIG. 6.

Once the I²C bus is active and it is communicating I²C messages, the Current START bit (B2) may be maintained at a value of 1 in order to indicate the continuation of sending I²C messages in a subsequent frame. In this way, both the Previous START bit (B2) value and the Current START bit (B2) value are 1.

When the I²C bus no longer needs to be active, then the value of the Current START bit may be set to 0. At this point, the Previous START bit had a value of 1 and the Current START bit has a value of 0 indicating that the I²C data in the current frame is to be transmitted and then the I²C communication is to be terminated for the next frame. This is analogous to sending out the STOP bit in the I²C communication example shown in FIG. 6.

In some embodiments, the NEXT transaction field may be used to prepare the I²C command port for the next command. This is beneficial since the I²C bus is typically slower than a bus communicating according to the multiformat communication protocol. An example embodiment for using the NEXT transaction field is shown in FIG. 7C (please note that the multiformat communication protocol may also be represented by the symbol MF in the description and in the figures). The NEXT transaction field may be used to automatically READ 8 bits or 16 bits (as described previously) from an I²C device and thus prepare for the next command. An 8 bit READ operation for the next frame may be chosen by setting the NEXT transaction field to "01". A 16 bit READ operation for the next frame may be chosen by setting the NEXT transaction field to "10". In both of these cases, the I²C device is preparing for a READ operation in the next frame which will transmit the data to be read which saves having to do this operation using two frames. In other words, by telling the external I²C device that a READ operation will be started in the next frame, the external I²C device has a chance to perform the I²C READ operation before the actual request is made. This means that the I²C master device may have received data from any of I²C slave devices 104a-104d, before the actual READ request is made using the multiformat communication protocol. This allows the I²C port+master module 136 will be able to respond to this READ request without any delays. If the next operation is not a READ operation or this is the end of an I²C communication, the operation "None" may be chosen by setting the NEXT transaction field to "00". The default value of the NEXT transaction field is "Idle" or "00". In other configurations, it is possible to enable enough delay for the I²C bus simply by choosing a sufficiently low bus clock frequency for the multiformat communication protocol (which may also be referred to as a multiformat interface) and using a large number of columns. However, for the general case, this may not be the best solution.

It should be possible to define any legal I²C sequence using combinations of the values for Previous START, Current START, and the NEXT transaction field using 8 bit operations. The use of 16 bit data may be accommodated by adding two operational codes or using the dedicated data space for these operations. Assuming 16 bit operations were added to the operational codes, there may be some problems in mixing these commands, since READ and WRITE operations using 16 bit access would give even register addresses {e.g. 0, 2, . . . , 510}. Therefore, it may not generally be possible to perform a 16 bit READ operation immediately followed by an 8 bit READ operation due to the encoding used. In this case, the 16 bit operation may indicate a value of "00" or None for the NEXT transaction field. The next operation may then issue an 8 bit READ and discard the invalid DATA, because the I²C slave device is not yet ready to respond and then issue a "Prepare 8 bit READ", followed by the 8 bit READ operation. Notice, the READ operations read the I²C messages from the I²C bus and the WRITE operations send I²C data to the I²C bus for storing inside a register of an I²C slave device that is attached to the I²C port 136 of the intermediate slave device 102 (also known as a multiformat slave device 102).

FIGS. 7B and 7C show that I²C traffic can be controlled efficiently, by using these 3 status bits (i.e. the START and NEXT Transaction fields) in every frame. The reason this is more efficient, is that the I²C port+I²C master module 136 will know ahead of time, that a READ request should be issued so that the transfer of data from any of I²C slave devices 104a-104d is completed and the I²C port+I²C master module 136 has the data available, when port the I²C port 126 later asks the I²C port+I²C master module 136 to give the result of the READ operation. This avoids having to wait another frame to receive the response.

Referring now to FIG. 7D, shown therein is a conceptual illustration of an I²C port register map that may be used for performing I²C operations using the multiformat communication protocol. There are not enough data bits (only a total of 8) in the I²C command register to send both status bits (e.g. the start bit, the stop bit, etc.) and also send the 8 I²C data bits. Accordingly, in this example embodiment, three address bits from an I²C port register map may be used for performing I²C operations using the multiformat communication protocol. In other words, the address bits are interpreted as I²C operational control bits (START, STOP, NEXT Transaction, etc.). In an example embodiment, 8 addresses of the I²C port and I²C master module 136 may be used to signify the status of the START bit and the NEXT transaction bits. Accordingly, status information may be sent by using "different" addresses. Therefore, reading or writing to different addresses (addresses 0x00 to 0x07 in this example) allows for performing a READ or WRITE from the I²C port+I²C master module 136, while also sending some control information that may be used to set the START and STOP bit for the I²C communication so that the I²C port+I²C master module 136 is instructed on what to do in the next frame and the next I²C command that it will send out. The receiving port will use this address information as an indication of what bits (e.g. the START bit, the STOP bit, etc.) are set or are not set.

Therefore, according to the teachings herein, the address bits are used for something that they are normally not used for, and the result is a different interpretation of the bits that are sent from a master device to a slave device. In other words, according to the teachings herein, instead of interpreting the address bits as a real address, the address bits may be interpreted as I²C status or control bits. The advantage of this approach is that the original three multiformat communication protocol commands (e.g. an 8 bit READ, an 8 bit WRITE and a PING operation) do not need to be extended with new messages or new operational codes in order to support I²C message tunneling.

The ACK bit may be activated if the I²C STOP bit is active and all messages have received an active I²C ACK from the addressed slave device, i.e. to indicate "transaction message completed". This function may also use status and IRQ status mask bits. The IRQ bit may be activated immediately if there is a missing ACK during a transaction (in which case the transaction incomplete) or a Not Acknowledge (NACK) bit may be set. Furthermore, the ACK bit in the multiformat communication protocol will not be activated if the I²C ACK was missing during any I²C transaction.

In another embodiment, a dedicated NACK bit may be activated by the I²C master module 136, if the transaction was not successful, indicating to the I²C port 126 at the master device 100, that the transaction did not complete and special action may need to be taken.

Referring now to FIG. 7E, shown therein is a table showing example frame rates, frame lengths and clock speeds using the multiformat communication protocol to transfer I²C messages. In particular, the table shows the maximum and minimum speeds for the I²C clock rates for different frame parameters such as the Frame rate and the Frame length. As can be seen, the maximum speed of I²C operation in this example embodiment is limited to 3.4 Mbaud. Therefore, some configurations will ultimately be limited by the highest speed of the I²C interface (3.4 Mbaud), and not by the multiformat communication protocol.

Normally, the activation of a new command may be initiated by an interrupt from the multiformat master device to a master controller (state machine, microprocessor, etc.) regardless of whether the command was completed or not completed. If it is desired to be able to write many values into I²C registers, a circular buffer may be used to avoid disturbing the main processor (that controls the multiformat bus master) too often. This buffer may contain the following values: the device address (4 bits), the port field (4 bits), the byte to write (8 bits), the START field (1 bit), and the Next Transaction field (2 bits) for a total for 19 bits times the length of the circular buffer. In some cases, the information in the device and port fields may be the same for all commands saved in the circular buffer. In this case 11 bits may be required for every command. If the state machine that offloads the buffer includes a check of the next two I²C commands, it may be possible to reduce the buffer width to 10 bits and merely encode each word as a data value (8 bits), a START/STOP bit and a read/write bit. If the state machine sees a change from a WRITE condition to a READ condition during a stream of commands (the START bit is continuously one), then the state machine may automatically issue a RESTART command. The I²C STOP condition may still be indicated by transitioning from a one to a zero and the START I²C condition may be indicated by a zero to one transition both signaled by the START/STOP bit. In other embodiments, the RESTART condition may be indicated by the next transactions field.

In some embodiments, it may be possible to add a receive buffer to store results from I²C READ operations, i.e. 23 bits per received entity (e.g. the I²C device address, the I²C register address, and the 8 bit I²C value) or 39 bits per entity (in case of 16 bit register addresses and 16 bit I²C data). In this way, the main processor controlling the multiformat master device can be completely offloaded for longer periods of time.

Figure 8A:
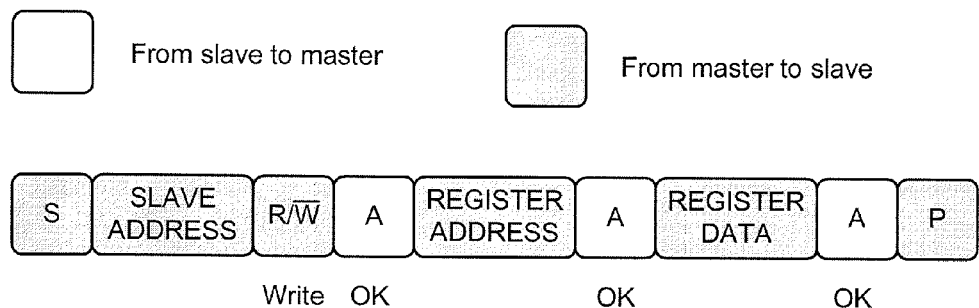
FIG. 8A is an example of an $I^2C$ WRITE operation.
Figure 8B:
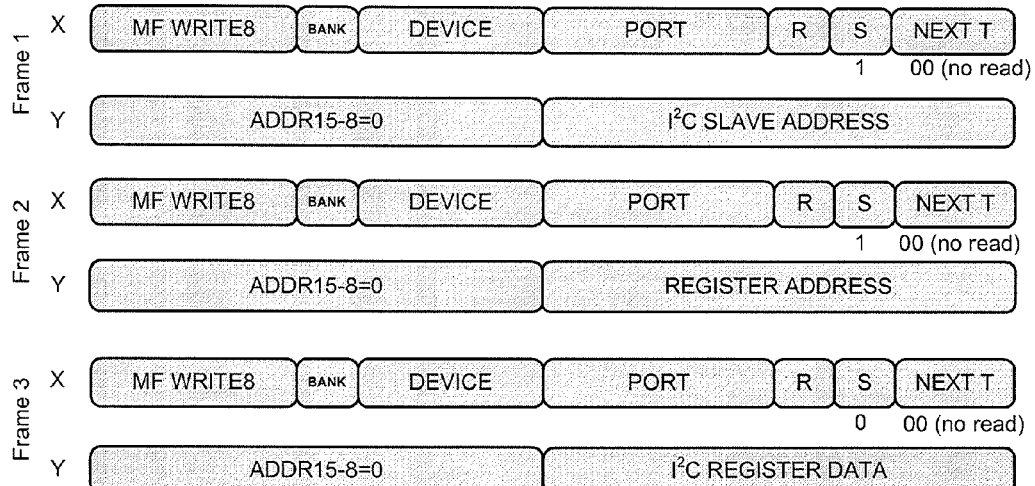
FIG. 8B is an example embodiment for carrying out the $I^2C$ WRITE operation of FIG. 8A using the multiformat communication protocol.

Referring now to FIGS. 8A and 8B, shown therein is an example of an I²C WRITE operation to a register inside an I²C device using the I²C communication protocol (FIG. 8A) and a corresponding series of frames according to the multiformat communication protocol that can be used to achieve the same operation (FIG. 8B).

In FIG. 8A, the operation begins with the I²C master device sending a START bit followed by the 7 bit address of the I²C slave device and a bit indicating that a WRITE operation will occur. The I²C slave device then acknowledges receipt of this I²C message by setting the ACK bit. The 120 master device then sends the register address and the I²C slave device activates the ACK bit upon successful reception. The I²C master device then sends a third byte, indicating the value of the register being written to. The I²C slave device will then respond with an ACK when it successfully receives the third byte. When the transaction is over, the I²C master device sends the STOP bit to terminate the I²C transfer over the I²C bus.

As shown in FIG. 8B, an example embodiment for carrying out the 8 bit I²C WRITE operation of FIG. 8A using the multiformat communication protocol uses four frames. This is an example of how the general control channel scheme may be used to send I²C messages using the multiformat communication protocol since a portion of the control space may be used to send I²C commands and I²C data.

With respect to the communication shown in FIG. 8B, the S command field has not been shown for ease of illustration but it is used for its original intended purpose in all three frames and is transmitted before the X command field in. The X command field is used to send commands to the port that is communicating according to the multiformat communication protocol (e.g. port 136 in FIG. 4). The Y command field is used to send the I²C commands and communicate with the I²C port of an I²C slave device (e.g. one of I²C slave devices 104a-104d).

In frame 1, the S field (not shown) is sent first carrying the synchronization information. The X field is then transmitted having the command operation of an 8 bit WRITE along with the device address of the slave device and the register address at the slave device in which the slave device is communicating according to the multiformat communication protocol. The X field also includes information for the I²C START bit for this I²C transaction. The R field is reserved so it is not currently used or defined in this example embodiment. The Y field is then transmitted carrying the I²C slave device address. Accordingly, the first frame is equivalent to sending the I²C START bit, the I²C slave device address and indicating that an I²C WRITE operation will occur, which is the first three blocks shown in at the top of FIG. 8A. At this point the intended I²C slave device sets the ACK bit when it successfully receives this transmission.

It should be noted that in this example embodiment the R field is reserved and it is not used. Furthermore, the BANK field is used to indicate the current memory bank that is being used in the MF protocol but it is not used by the I²C protocol. The PORT field is used to indicate the specific port inside the MF slave device (e.g. port 136 of intermediate slave device 102 for example) that handles the actual I²C communication. In other words, the PORT field provides the address of the hardware inside the MF slave device that is responsible for I²C communication. This address is typically fixed.

In frame 2, the S field is again sent first carrying the synchronization information. The X field is sent with the same information that it had in frame 1 because the same port of the MF slave device must be written to (e.g. I²C port+master module 136 of the intermediate slave device 102 shown in FIGS. 3 and 4). However, the X field also signals a START bit to 1 to indicate that there will be more activity on the I²C bus 106. The Y field is now sent with the register address at the intended I²C slave device. At this point the intended I²C slave device sets the ACK bit when it successfully receives the transmission. Accordingly, the second frame is equivalent to the 5$^{th}$ and 6$^{th}$ blocks shown in FIG. 8 for sending the I²C register address.

In frame 3, the actual writing of the I²C data is performed by submitting the register data. The S field is again sent first carrying the synchronization information. The X field now indicates that after this frame the command is terminated with an I²C STOP bit and that the Y field contains the WRITE data for the port 136. The Y field is now sent with the register data for the intended I²C slave device. The I²C port+master module 136 will then take the register data and transfer it to the intended I²C device attached to the I²C bus 108. At the end of frame 3, the I²C master module 136 will submit a STOP condition and transmits this on the I²C bus 108 to I²C devices 104a-104d.

Figure 8C:
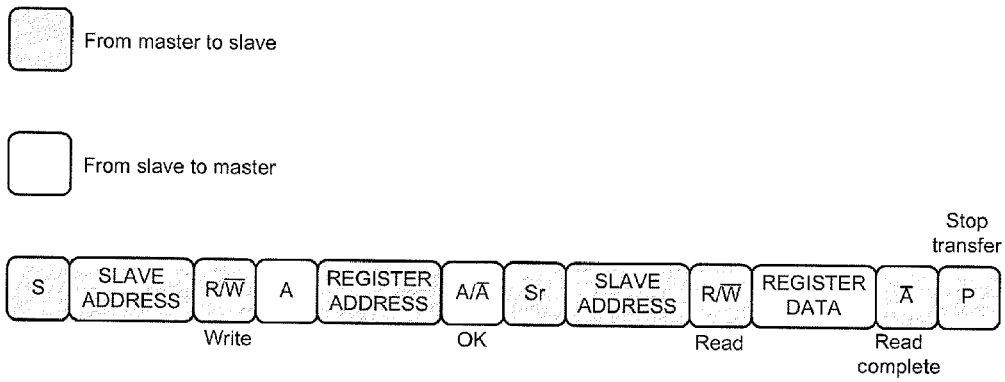
FIG. 8C is an example of an $I^2C$ READ operation.
Figure 8D:
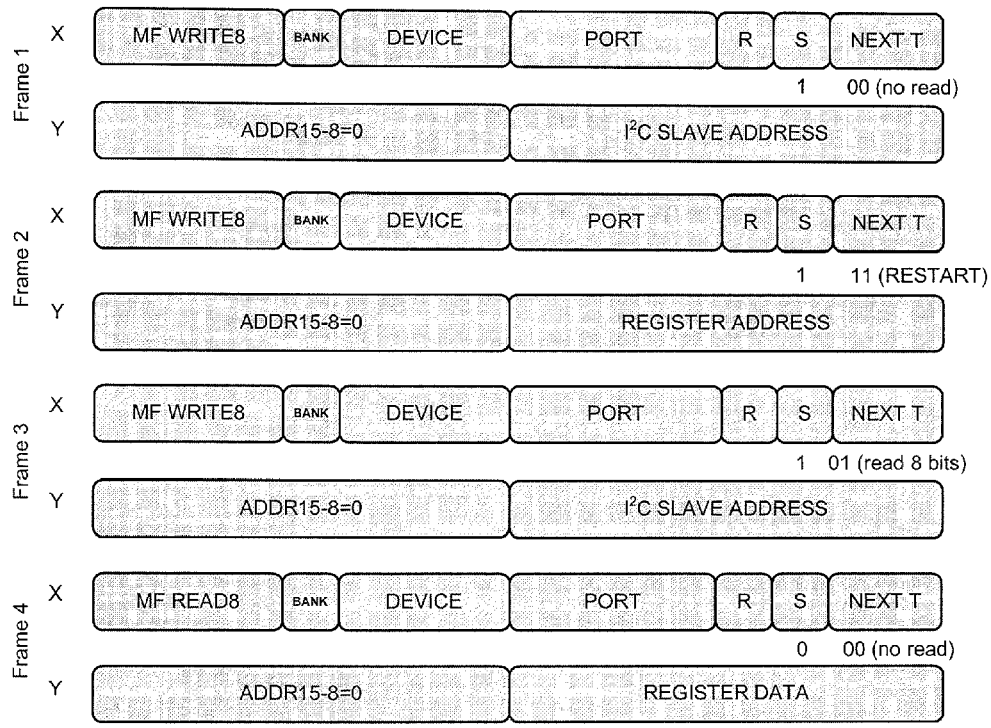
FIG. 8D is an example embodiment for carrying out the $I^2C$ READ operation of FIG. 8C using the multiformat communication protocol.

Referring now to FIGS. 8C and 8D, shown therein is an example of an I²C READ operation from a register inside an I²C device using the I²C communication protocol (FIG. 8C) and an example of a corresponding series of frames of the multiformat communication protocol that can be used to achieve the same operation (FIG. 8D).

In FIG. 8C, the operation begins with the I²C master device sending a START bit followed by the 7 bit address of the I²C slave device and a bit indicating that a WRITE operation will occur. The I²C slave device then acknowledges receipt of this I²C message by setting the ACK bit. The I²C master device then sends the register address at the I²C slave device and the I²C slave device acknowledges receipt of this I²C message by setting the ACK bit high. The I²C master device then sends a repeated start condition (Sr) also known as a RESTART condition, issues the same I²C slave device address and requests a READ operation. The I²C slave device will respond with the register data while the I²C master device will terminate the reading by issuing a NACK condition indicating the end of the READ operation. If the I²C master device issues several READ commands following each other immediately, the I²C master device may then issue an ACK condition on every command until the last command for which it would issue a NACK (this is based on the I²C communication protocol). When the I²C transaction is over, the I²C master device sends the STOP bit (shown by P in this example) to terminate the I²C transfer over the I²C bus.

As shown in FIG. 8D, an example embodiment for carrying out the 8 bit I²C READ operation of FIG. 8C using the multiformat communication protocol uses four frames. It should be noted that a 16 bit I²C address and data space can be achieved by utilizing the high byte of the address subfield of the Y field (e.g. set it to a value different from zero). FIG. 8D shows an example of how the general control channel scheme may be used to send I²C messages using the multiformat communication protocol since a portion of the control space may be used to send I²C commands and I²C data. This may correspond with using the control space defined by the S, X and Y fields of the multiformat communication protocol that were shown in FIGS. 5D-5F, for example.

Similar to the situation in FIG. 8B, the S command field has not been changed from what is shown in FIG. 5D and it is used for its original intended purpose of synchronization in all four frames and has not been shown in FIG. 8D for ease of illustration and will not be further described in this example. Similar to FIG. 8B, the X command field is used to send commands to the I²C port of the intermediate slave device 102 that is communicating according to the multiformat communication protocol (e.g. I²C port 126 in FIGS. 3 and 4). Similar to FIG. 8B, the Y command field is used to send the I²C commands to the I²C port (e.g. I²C port and master module 136 in FIGS. 3 and 4) of the multiformat intermediate slave device 102 that communicates with an intended I²C slave device (e.g. one of I²C slave devices 104a-104d).

In frame 1, the X field is transmitted having the command operation of an 8 bit WRITE along with the multiformat slave device address (e.g. slave device 102 in FIGS. 3 and 4) and the register address at the multiformat slave device which is communicating according to the multiformat communication protocol (e.g. port 136 of intermediate slave device 102 in FIGS. 3 and 4). The X field also indicates that the START bit is 1 indicating the beginning on an I²C transaction but the NEXT transaction field is set to '00' indicating no READ operation at this point. The Y field is then transmitted carrying the I²C slave device address. Accordingly, the first frame is equivalent to sending the I²C start command, the I²C slave device address and indicating the I²C WRITE operation. At this point the I²C slave device sets the ACK bit upon successful reception of this information.

In frame 2, the X field is sent with the same information that it had in frame 1, because a message is being sent to the same I²C port receiver (e.g. port 136 in FIGS. 3 and 4) at the same MF slave device (e.g. slave device 102), except that a RESTART condition is now submitted to prepare for a READ operation in frame 3 by setting the NEXT transaction field equal to "RESTART" (11). The I²C master module inside 136 will then submit a RESTART condition to prepare for the repeating the I²C device address and begin the READ operation. The Y field is now sent with the register address of the I²C slave device. Accordingly, the second frame is equivalent to sending the I²C register address, which is the fifth block shown in FIG. 8C. At this point the I²C slave device sets the ACK bit, when it receives this information.

In frame 3, the next command from the multiformat master device 100 will be to submit the same device port address as was used earlier in frames 1 and 2, and the NEXT transaction field is set equal to "01" to prepare for a READ operation in the next frame. This is all transmitted in the time slots defined by the X field. The Y field is sent with the I²C slave device address. Accordingly, at the beginning of the third frame the I²C port+master module 136 will be sending the RESTART condition to the I²C slave device address and the I²C port 126 will prepare the I²C port+master module 136 for an 8 bit I²C READ operation.

In frame 4, the X field is sent indicating an 8 bit READ operation along with the device address and the port address that was sent in the first three frames. The Y field now receives register data that is read by the I²C port and master module 136.

It should be noted that four frames were used to accomplish an 8 bit I²C READ operation in this example. When comparing the actual information transferred (1 byte) as compared to the total command bandwidth used (a total of 4×3×2=24 bytes), it can be seen, that this particular scheme, while being simple, is not very efficient. For greater efficiency, the dedicated data space may be used. For example, see FIGS. 10C and 10D for embodiments which result in faster I²C READ and WRITE operations and less waste of control space bandwidth. These examples show the execution of an I²C command within a single frame, but may require faster response from the addressed I²C slave device.

Figure 9A:
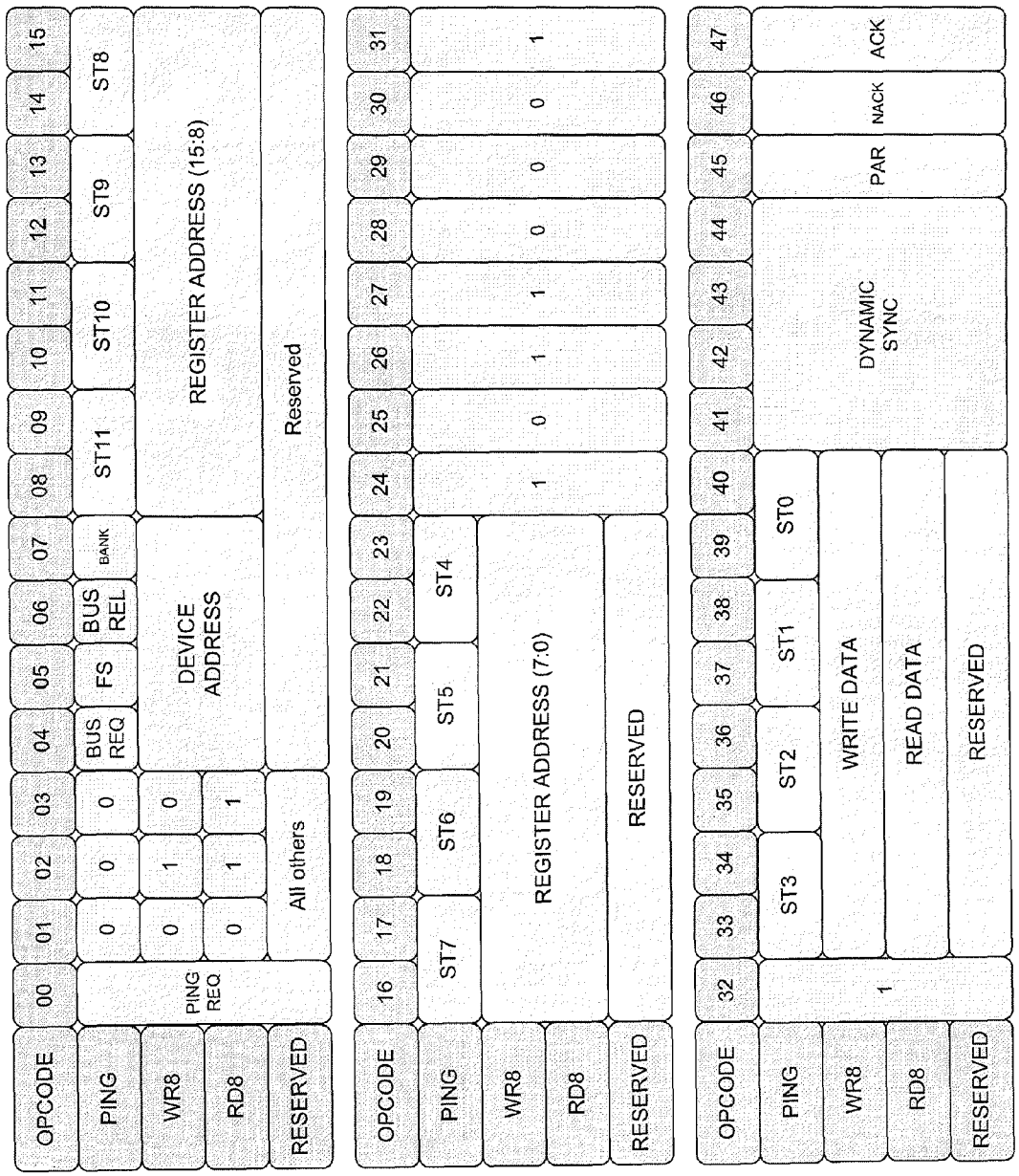
FIG. 9A is an example embodiment of bit allocations in a control space when using the multiformat communication protocol to implement various $I^2C$ commands.
Figure 9B:
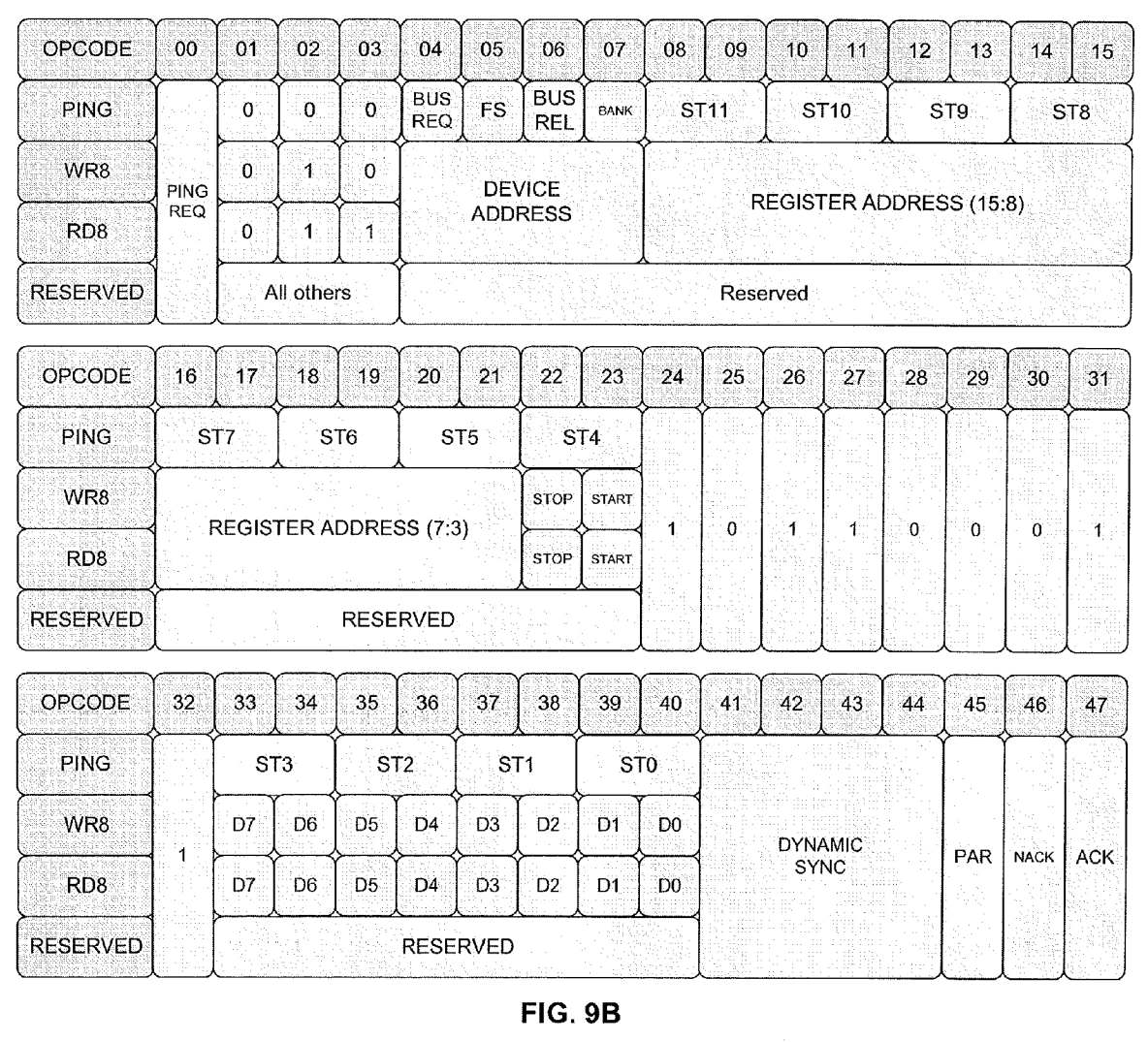
Figure 9C:
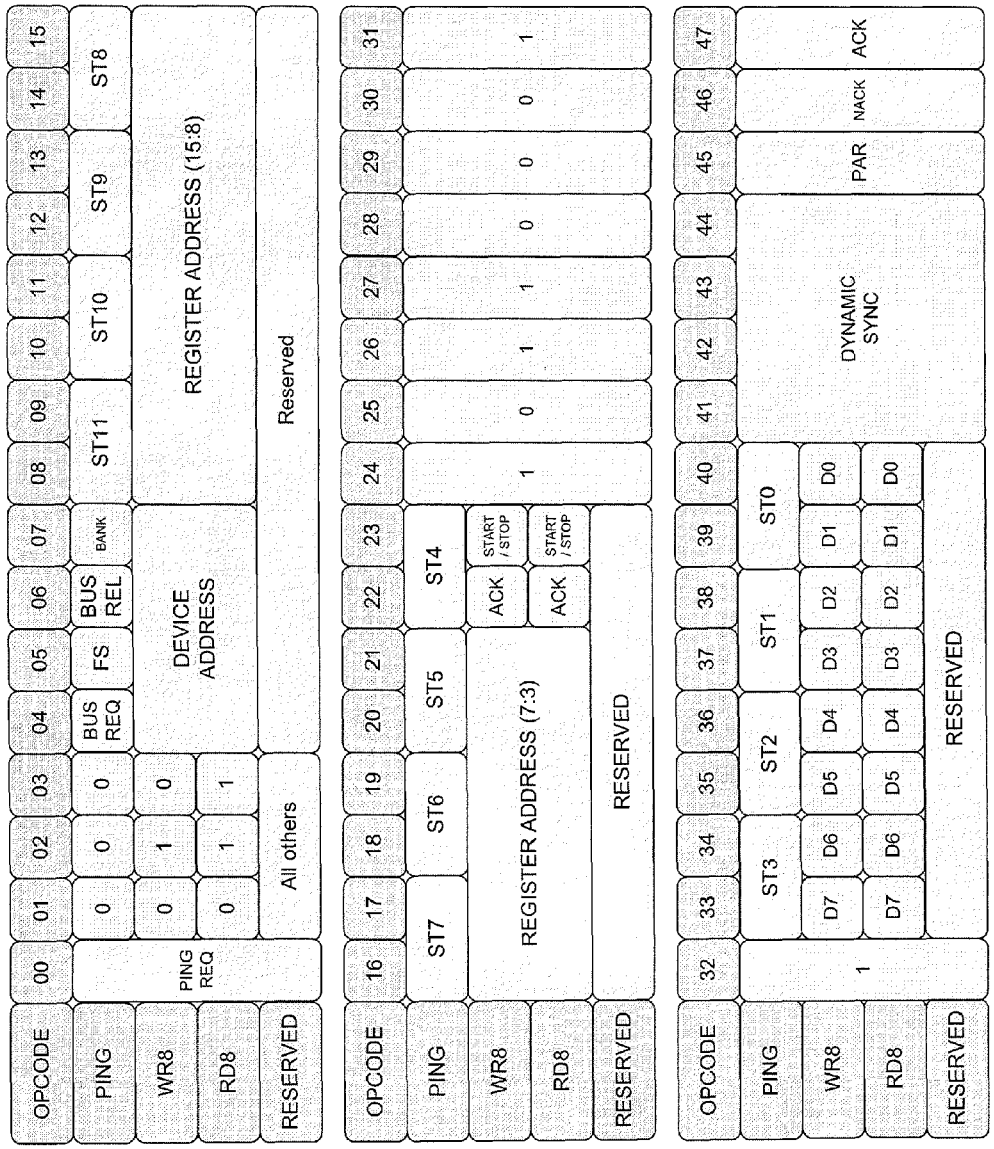
FIG. 9C is another example embodiment of bit allocations in a control space when using the multiformat communication protocol to implement various $I^2C$ commands.
Figure 9D:
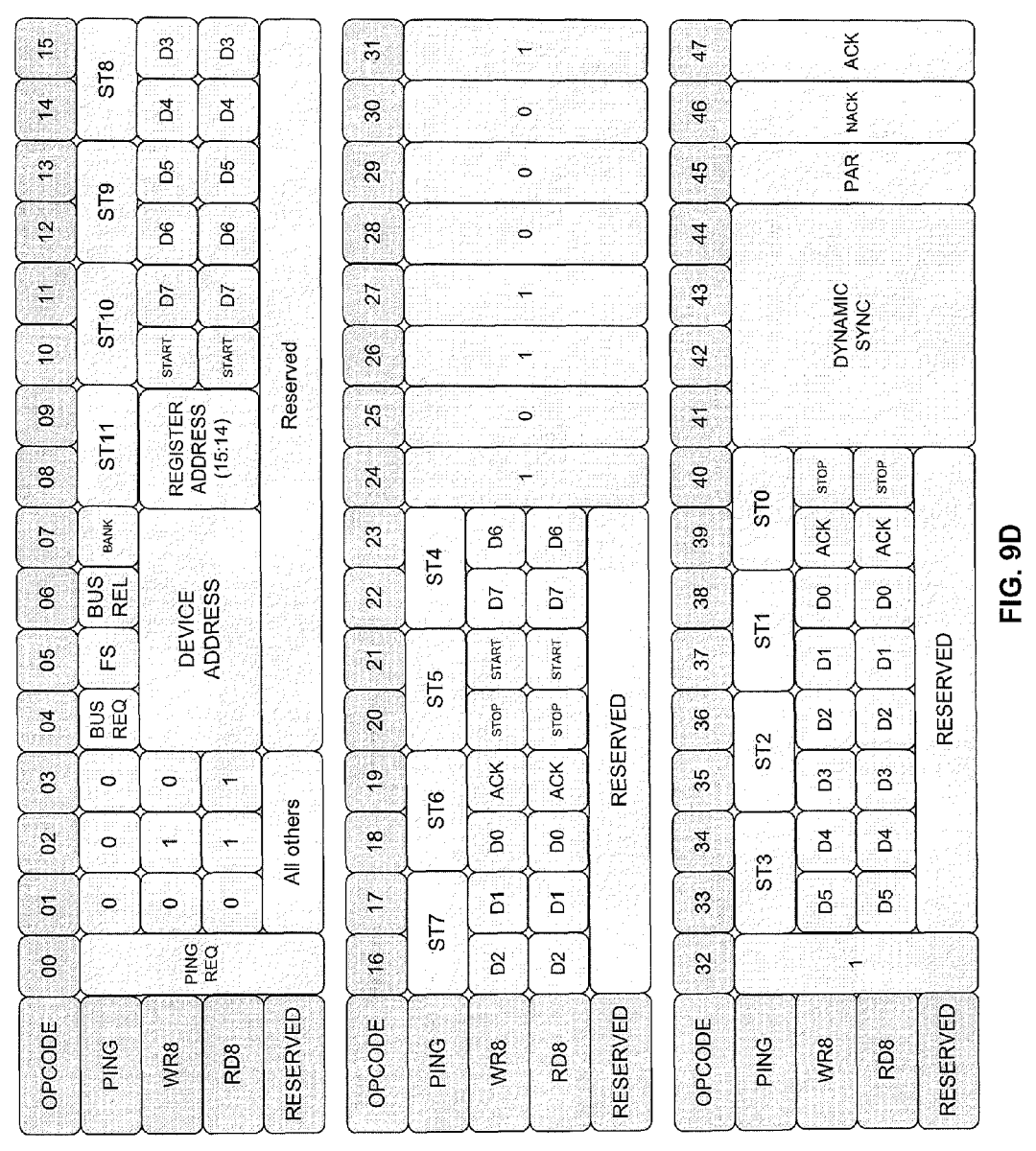

Referring now to FIG. 9A, shown therein is an example embodiment of another frame format showing bit allocations in a control field or control space when using the multiformat communication protocol to implement various I²C commands. This frame format has the advantage that there is more of a time delay between the transfer of a register address and the time at which the data are read back. This has been accomplished by moving the constant synchronization word ("10110001") between the register address field (bit 16 (B16) to bit 23 (B23)) and the data field (B33 to B40). Furthermore, there is some spacing in the time slots between the reading or writing of the data (B33 to B40) and the acknowledgement (B47) or not acknowledgement (B46) of data by placing the dynamic sync field (B41 to B44) between the data field (B33 to B40) and the parity, acknowledgement and not acknowledgement bits (collectively B45 to B47).

It should be noted here that the bit allocation in the example embodiment of FIG. 9A allows for the multiformat to I²C communication shown in FIG. 8B or FIG. 8D. In particular, the MF operation may occur in bits B1 to B3, the device address is shown in bits B4 to B7 for the READ (RD8) and the WRITE (WR8) operations. Furthermore, the BANK bit is bit B7, and the register address at B8 to B15 may be used to indicate the information for the PORT, S, and NEXT T fields. The data field B33-B40 may be used to transfer the I²C slave device address, the register address at the I²C slave device and the I²C register data depending on which frame is being communicated (e.g. frame 1, 2 or 3 shown in FIG. 8B).

Referring now to FIG. 9B, shown therein is another example of bit allocations that may be used in the control space to allow for the tunneling of I²C commands in the control space when using the multiformat communication protocol (which may also be referred to as the multiformat interface) to implement various I²C commands. Two bits have been allocated to indicate the START and STOP I²C condition by utilizing address bits for this purpose. The ACK and NACK fields can be used to indicate the status of the transaction.

Referring now to FIG. 9C, shown therein is another example embodiment of bit allocations that may be used in the control space when using the multiformat communication protocol to implement various I²C commands. In this case, an extra field has been allocated for an extra ACK bit. This has the advantage that there is more time for an external I²C device to respond. In this case the ACK bit (B47) would be used to indicate status by any multiformat device while ACK (B22) would be used to indicate the response from I²C slave status (e.g. modules 104a-d). Since there is only one bit for the START/STOP condition, the encoding shown in FIG. 7B may be used. Since there is no NEXT transaction field, the RESTART command may be submitted as a STOP and a START command using an empty word in between or using the ACK bit time slot before the START/STOP for the RESTART condition and B47 for the all ACK.

Alternatively, the RESTART condition may be detected by a state machine whenever there are two consecutive START/STOP bit values equal to one and the command changes from a WRITE operation to a READ operation. This will inform the I²C port+master module 136 that it needs to insert a RESTART command, resubmit the previous device address and then perform a data READ.

In yet another example embodiment, the normal ACK and NACK bits may be used directly by the I²C port+master module 136 and two control bits START and STOP may be allocated for every transferred command. This scheme is simple to use but precludes more than one I²C command in every command space (i.e. S, X & Y fields).

Referring now to FIG. 9D, shown therein is another example embodiment of bit allocations in the control space in which multiple address fields are combined with data when using the multiformat communication protocol to implement various I²C commands. This potentially allows two I²C subcommands (e.g. START, DATA, ACK or STOP) to be submitted in every frame. In this case, the master device 100 is made aware that the I²C port 126 expects data in the field normally allocated for addresses. Alternatively, in some implementations two additional operational codes may be allocated to indicate that the I²C port 126 is able to make this type of I²C transmission and to enable the master device 100 to support this functionality.

Referring now to FIG. 10A, shown therein is an example embodiment of a frame format that can be used for the multiformat communication protocol when using a dedicated data space for sending a single I²C command per frame. The main difference between this scheme and that of FIGS. 9B, 9C and 9D is that the I²C transfers happen in the dedicated data space. This means the scheme is very efficient with respect to bandwidth use but requires use of some of the data space that may not be available in all configurations of a multiformat communication protocol frame due to the particular use case scenario. In this case 11 data bits are used for the I²C transfer. The rest of the data space may be used for other data that is transferred according to the multiformat communication protocol without I²C tunneling. Often, there are empty slots below the command bits in column zero of the frame, which may be utilized for dedicated I²C transfers. Accordingly, in order for this scheme to work, there needs to be at least 11 rows below the command space, which places a restriction on the minimum number of rows that are used for the frame.

Figure 10B:
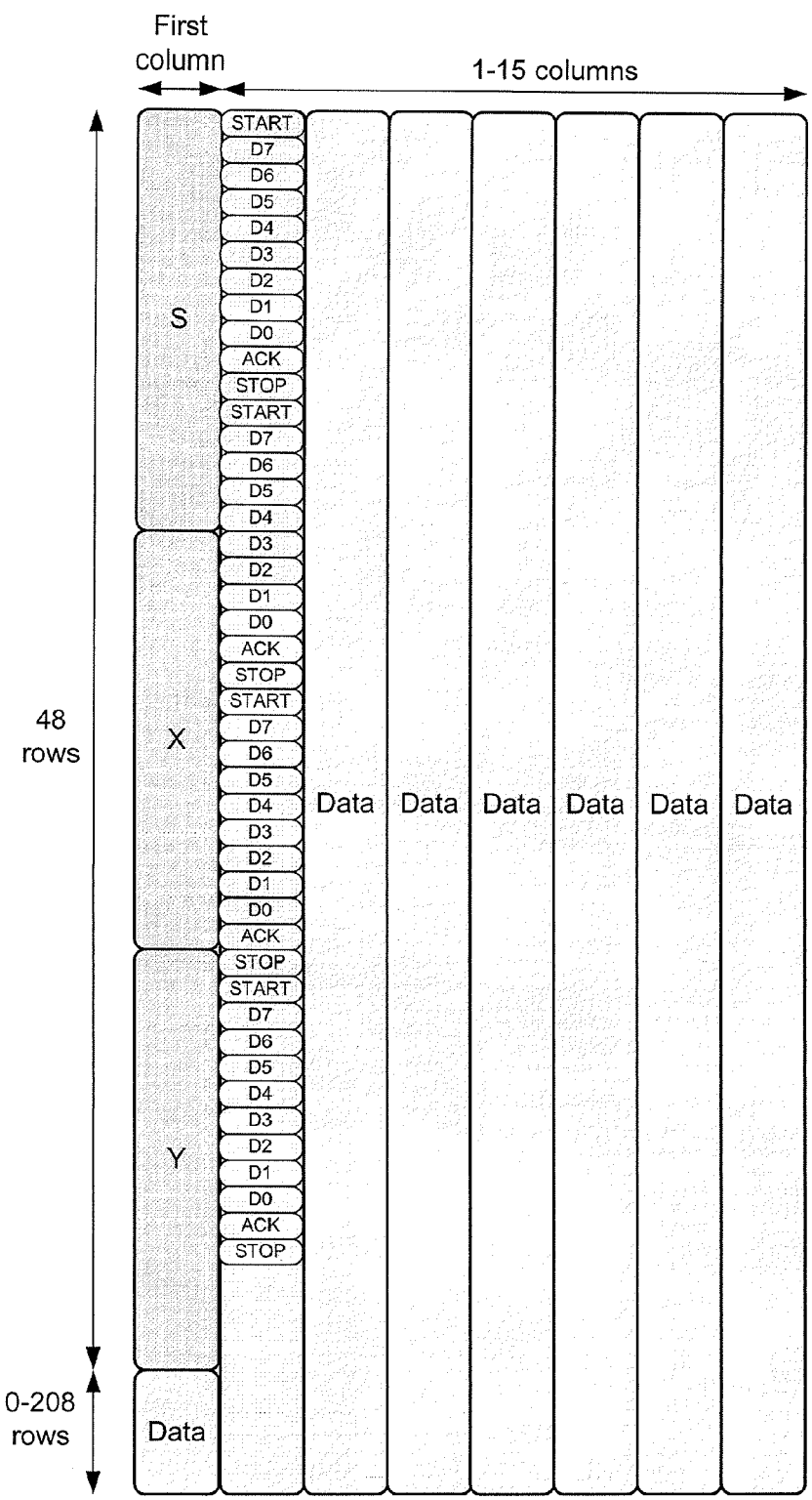
FIG. 10B is another example embodiment of a frame format for the multiformat communication protocol when sending $I^2C$ messages.
Figure 10C:
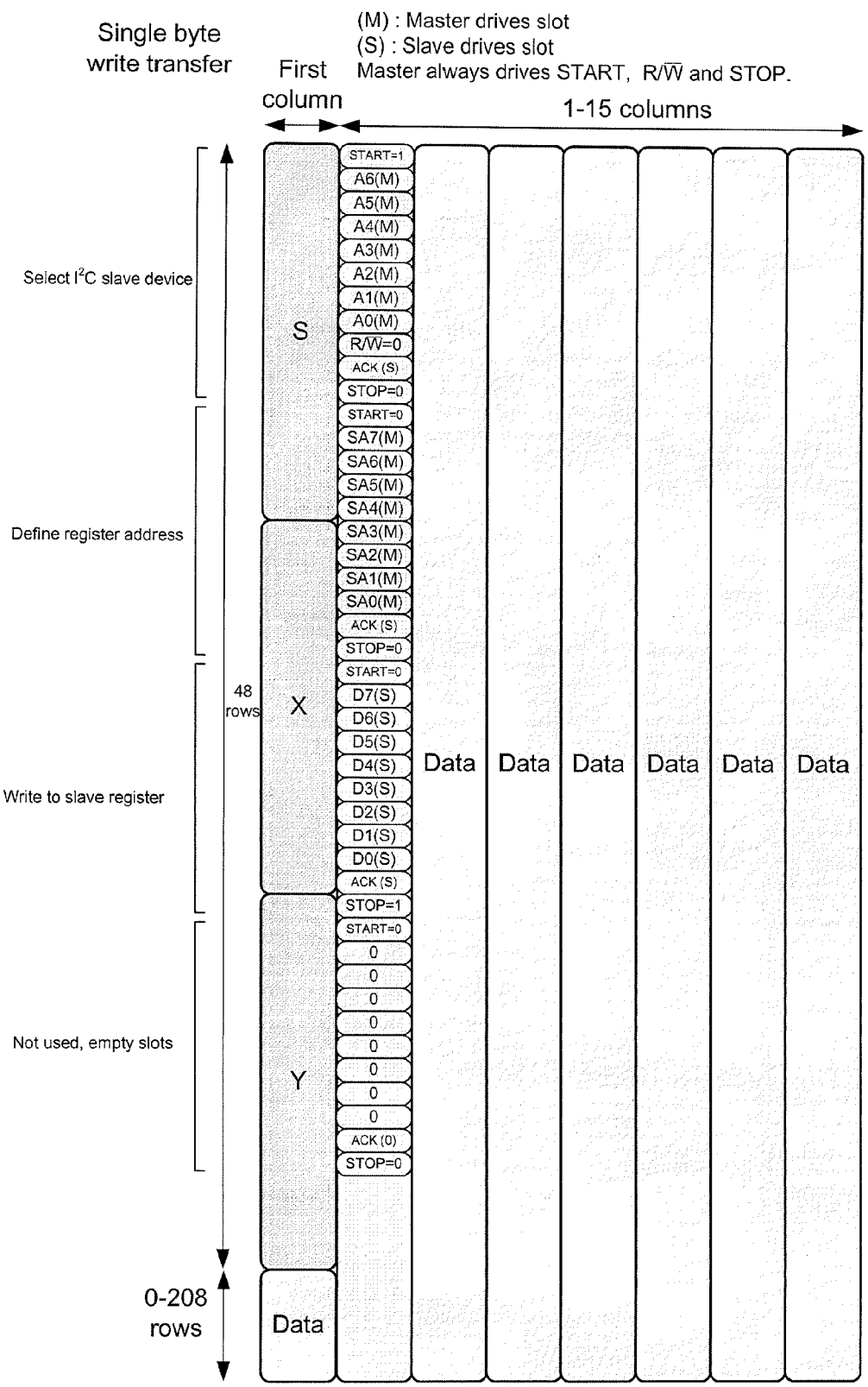
FIG. 10C is another example embodiment of a frame format for the multiformat communication protocol when sending $I^2C$ messages.

Referring now to FIG. 10B, shown therein is another example embodiment of a frame format that can be used for the multiformat communication protocol when using a dedicated data space for sending a full I²C command per frame. The embodiment shown in FIG. 10B is similar to that shown in FIG. 10A, but it uses a different part of the data space. In this case 44 data bits are used for the I²C transfer. In the example shown, column one of the frame has been used for dedicated I²C transfers. Furthermore, this example shows that multiple I²C transactions may be sent in the data space depending on which part of a frame (e.g. one column of the frame) is used for transmitting I²C messages Referring now to FIG. 10C, shown therein is another example embodiment of a frame format that may be used for the multiformat communication protocol when sending or tunneling an I²C WRITE command. This scheme is similar to FIG. 10B, but the figure shows an actual I²C WRITE command being transferred, where FIG. 10B shows a more general format. First, the I²C slave device address (bits A6(M) to A0(M)) is transmitted along with defining the I²C WRITE operation, followed by the register address (bits SA7(M) to SA0(M)) at the I²C slave device, and then register data (bits D7 to D0) for writing to this register address. The last part of the I²C data space is unused in this case, because the I²C WRITE command only needs three I²C subcommands.

Figure 10D:
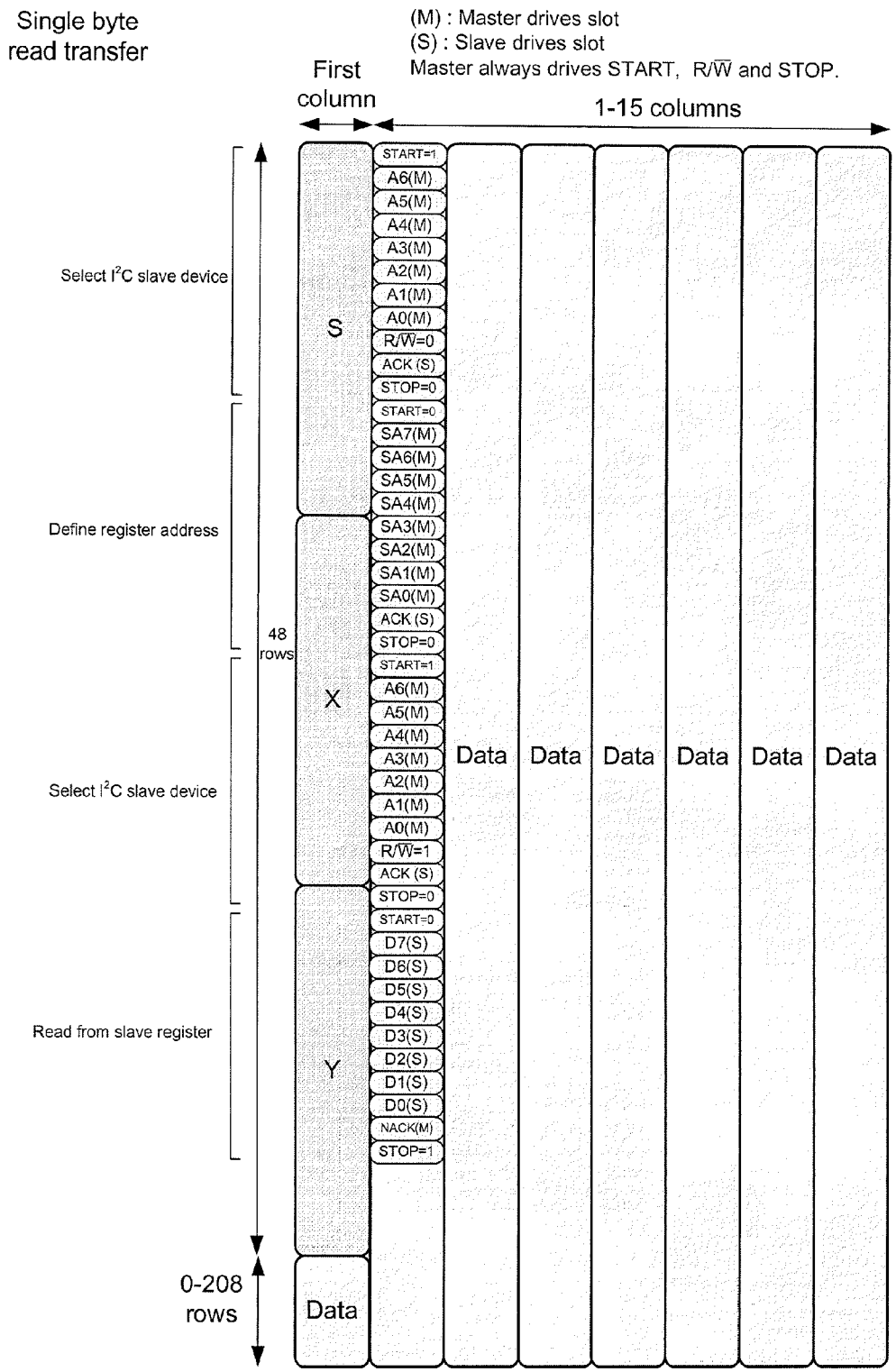
FIG. 10D is another example embodiment of a frame format for the multiformat communication protocol when sending $I^2C$ messages.

Referring now to FIG. 10D, shown therein is another example embodiment of using a frame format for the multiformat communication protocol when sending or tunneling an I²C READ command. First, the I²C slave device address (bits A6(M) to A0(M)) is transmitted along with defining the WRITE operation, followed by register address (bits SA7(M) to SA0(M)) at the I²C slave device. The RESTART command is then transmitted, followed by the I²C slave device address (bits A6(M) to A0(M)) and a READ request. Finally, register data (bits D7 to D0) are read from the I²C device, the I²C master device responds with a NACK condition and terminates the command with a STOP condition. In this example, the entire I²C port data space of 44 bits is utilized.

In order to facilitate the I²C tunneling using the multiformat communication protocol, regardless of whether the general control channel or the dedicated control channel scheme is being used, the required devices and ports that are used for I²C tunneling are typically programmed and initialized before I²C tunneling may occur. Accordingly, the MF device that is used (e.g. intermediate slave device 102) and the port (I²C port 126) at the MF device that is used to facilitate I²C communication is setup at initialization. Also, the the I²C port and I²C master module 136 is initialized. A software driver may be used to facilitate the setup of the ports.

The I²C port 126 and the I²C port and I²C master module 136 may be setup using commands, such as READ and mostly WRITE commands that are sent in the control space (e.g. the S, X and Y fields). A state machine or a device driver may be used so that the I²C port 126 sends the correct commands to the I²C port and I²C master module 136. After the I²C port 126 and the I²C port and I²C master module 136 have been setup, they both know when to start and stop transmission and reception of commands within a frame. This setup does not have to be done for every frame, but only before the particular I²Ccommunication starts.

The I²C port 126 is initialized to communicate according to the multiformat communication protocol but yet be able to send any information related to I²C messages (i.e. I²C commands and I²C data) to the I²C port and I²C master module 136 which is able to convert or translate any messages from the multiformat communication protocol to the I²C communication protocol and send these translated messages to a corresponding I²C slave device that is attached to the I²C bus 108. In an opposite manner, the I²C port and I²C master module 136 is able to convert or translate any messages received from an I²C slave device that is attached to the I²C bus 108 from the I²C communication protocol to the multiformat communication protocol. This translated message is then sent to the I²C port 124 for transmission on the multiformat bus 106 to an intended multiformat device such as the master device 100 or the master device 152.

For the example of FIG. 10A, after the I²C port 126 and the I²C port and I²C master module 136 have been setup, it will use the first 11 bits (i.e. rows 48-58) following the control space for the actual I²C communication. These ports 126 and 136 are also programmed with the status bits that are specifically used for I²C communication, i.e. the START bit and the NEXT transaction bits. The particular I²C slave device that is being addressed may then be sent in the first command in the data space and the register which is being addressed at the I²C slave device may be sent in the second command word as shown in the examples of FIGS. 10C and 10D. The content on the third and fourth commands will depend on whether it is a READ or WRITE command. They will contain a repetition of the device address and READ data or WRITE data and an empty command. Furthermore, an indication of whether the command is an I²C READ or an I²C WRITE operation may be sent in each command in the data space as is shown in the examples of FIGS. 10C and 10D. Accordingly, for the examples of FIGS. 10C and 10D, the I²C port 126 may be programmed with the 11×4 bits that are needed for the I²C communication in a particular data frame before I²C communication in that data frame may occur.

These transfers may be quite robust towards delays in the master controller as long as the next command is first executed after the previous frame has been completed, so that timing is good. The clock used for I²C communication (while activated, if there is no command it will be idle) may run only at certain clock speeds. This means, that the clock may not be below or above the range shown in the table 7E. If the I²C devices are outside of this range (typically slower), the I²C port and master module 136 may indicate a delayed response by setting a NACK bit or by not responding during the ACK timeslot. In some embodiments, the I²C port 126 of the master device 100 may simply use clock stretching to ensure direct tunneling of I²C commands. In this case, the I²C port 126 may stretch the clock line on the I²C interface 156 until the external I²C slave device (104a-104d) that is part of the I²C transaction has responded to the I²C port and master module 136 and this response is then communicated back to the I²C port 126. Due to other limitations, such as the I²C physical layer, the maximum rates often may not be reached. For most frame formats, the maximum I²C clock speed will be determined by the I²C physical layer.

Figure 11:
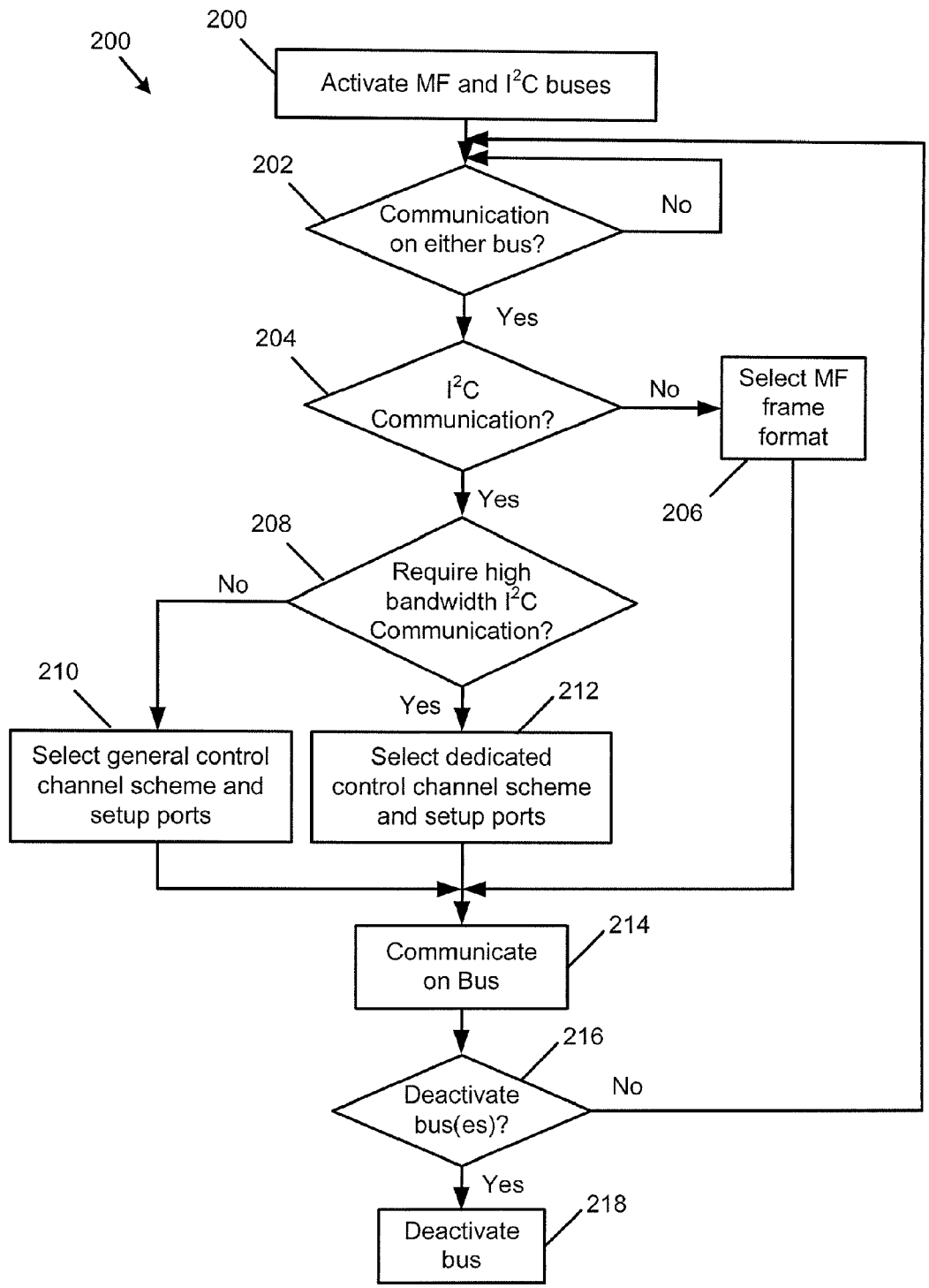
FIG. 11 is a flowchart of an example embodiment of an $I^2C$ tunneling method for tunneling $I^2C$ messages using the multiformat communication protocol.

Referring now to FIG. 11, shown therein is a flowchart of an example embodiment of an I²C tunneling method 200 for tunneling I²C messages using various embodiments of the multiformat communication protocol described herein.

At 202 the buses are activated on which the devices communicate according to the multiformat communication protocol and the I²C communication protocol. At 204 it is determined whether a current communication will be an I²C communication where a command or data is sent to an I²C device that only communicates according to the I²C communication protocol or if there is any data being sent by such a device. This may be determined based on a particular application that is running for a certain use case scenario, for e.g. a stereo system that is playing music. If an application has a need to send I²C commands, the devices communicating on the bus are programmed for this application (as is described below).

If it is determined that the current communication is not an I²C communication but a communication according to the multiformat communication protocol, then the method 200 proceeds to 206 where the appropriate multiformat communication frame format is selected. It should be noted that the MF frame format can be selected depending on the number of data channels that are being used to send information and whether any data channels are being combined to increase bandwidth. The determination of the MF frame format parameters are described in more detail in U.S. patent application Ser. No. 13/784,457, entitled "Multiformat Digital Audio Interface". For example the frame format may depend on the system frequency, the data and the control and other communication requirements. The method 200 then proceeds to 214 where the MF communication will occur. Furthermore, the command fields can be arranged as shown in FIGS. 5D-5F or in FIG. 9A. The actual section of frame format may depend on the system frequency, the data and control requirements and the devices that need to be supported.

If it is determined that the current communication is an I²C communication, then the method 200 proceeds to 208 where it is determined whether high bandwidth I²C communication is required. The bandwidth of the command space sets an upper limit for any I²C communication. If this bandwidth is not enough for the required application, the data space may then be used for I²C communication. The actual values may depend on the application, but assuming a single I²C transaction per frame, a bandwidth of up to about 500 kbaud may be achieved if the frame format comprises 48 rows and 8 columns. If more bandwidth is used in the data space for I2O communication, then there may not be enough data space for other applications that communicate according to the multiformat communication protocol without I²C tunneling. As an example then, for a high bandwidth I²C application (which requires more than 500-1000 kbaud) it may be preferable to use the dedicated channel control scheme.

If high bandwidth I²C communication is required, then the method 200 proceeds to 212 at which point the dedicated control channel scheme is used in which I²C commands and I²C data are sent in the data space of a frame. Examples of this are shown in FIGS. 10A to 10D. Since the I²C port 126 and the I²C port+master module 136 may be programmable, the actual data space that is being used for I²C communication may also be programmable and not fixed. Once the desired frame format is selected for the particular communication that is to occur, then the method 200 moves to 214 where communication occurs on the bus.

If it is determined at 208 that high bandwidth I²C communication is not required, then the method 200 proceeds to 210 at which point the general channel control scheme is used in which I²C commands and I²C data are sent in the control space, i.e. in the S, X and Y command fields, of a frame. Examples of this are shown in FIGS. 9B to 9D. Once the desired frame format is selected for the particular communication that is to occur, then the method 200 moves to 214 where communication occurs on the bus. The desired frame format for the general channel control scheme may be chosen so that there is enough bandwidth for control of the MF bus 106 and the I²C bus 108. This means that if the I²C requirements are relatively high, then a lower number of rows and columns may be chosen to increase the relative amount of bandwidth allocated to I²C control. It should be noted that the S, X and Y command fields shown in FIG. 5D-5F or 9A may be used as well with some modifications to represent the particular bits that are needed for I²C communication.

Once the communication has occurred on the bus at 214, it is determined whether the bus(es) (e.g. the MG bus 106 and the I²C bus 108) should be deactivated. If this determination is true, then the method 200 proceeds to 218 at which point the bus(es) are deactivated. If this determination is not true, then the method 200 may proceed to 202 at which point the method 200 waits until the next communication on either the MF bus or the I²C bus will occur.

It should be noted that in some embodiments, the allocation of bandwidth for I²C communication is fixed and a choice between using the dedicated and general control may not be possible. In this case there is no selection between using dedicated and general control method and this is fixed for the system before design.

Furthermore, it should be noted that the desired frame format (e.g. the number of rows and columns in a frame) may be selected by the master device 100, and then the slave device 102 will lock on to this frame format. Afterwards, the I²C port 126 and the I²C port+master module 136 will be programmed, so they both WRITE and READ data in the correct time slots according to the frame format locations. When using the command space for I²C communication, the frame format configuration may be somewhat fixed. However, when using the data space for I²Communication, the start point (e.g. column start and row start) of the I²C messages and the extent (e.g. number of columns and number of rows) of the I²C data may define how many commands are transferred per frame. These parameters are part of the multiformat communication protocol and are further explained in U.S. patent application Ser. No. 13/784,457, entitled "Multiformat Digital Audio Interface".

Furthermore, for systems that require a large control bandwidth, typically few rows and columns may be chosen for the frame format, so that the control space would take up most of the bandwidth. If the transfer of audio or other data is dominant, a larger number of rows and columns may be chosen. The actual selection will also depend on the system frequency, i.e. based on a dual edge clocking scheme the frame repetition rate is equal to twice the system clock divided by the product of rows and columns.

At least some of the various embodiments of the multiformat communication protocol described herein may be suited for use with pin-limited multiformat devices that have a need to tunnel I²C messages over these limited number of pins, but do not have the ability to do this because of the pin constraints (this is actually a common use case—chips have a limited number of pins). In this case, it is possible to later extend the functionality by adding the intermediate slave device 102 having the I²C port+master module 136.

Alternatively, at least some of the various embodiments of the multiformat communication protocol described herein may be used in a second use case scenario. The second use case for this is a physical layer where the number of data pins is limited to 1 (e.g. a single wire bus as was described in U.S. patent application Ser. No. 12/958,942, entitled "Single wire bus system") or 2 (e.g. a 2 wire bus as was described in U.S. patent application Ser. No. 13/784,457, entitled "Multiformat Digital Audio Interface"). In these cases, it is simply not possible both to support both multiformat audio and I²C data at the same time using separate interfaces. However, by using I²C tunneling over the multiformat interface, it becomes possible to support both multiformat audio and I²C data without the need to use another physical connector. As an example, a headset jack connector is typically limited to four pins, which may be used for a digital headset using ground, data, clock and power or an analog headset using ground, microphone, LEFT and RIGHT channels. Without the tunneling described herein, one cannot control an I²C device and send digital audio to a digital headset that includes I²C control and it is known that standard audio devices today use I²C.

In one broad aspect, in at least one embodiment described herein, there is provided a method for sending messages from a first device to a second device via an intermediate device, wherein the first and second devices communicate using first and second communication protocols respectively, the first and second communication protocols being different, the method comprising: initializing a first port at the intermediate device for communicating with the first device using the first communication protocol; initializing a second port at the intermediate device for communicating with the second device using the second communication protocol; sending any first messages received at the first port from the first device to the second port for translation into the second communication protocol and transmission to the second device; and translating any second messages received at the second port from the second device from the second communication protocol to the first communication protocol and sending the translated messages to the first port for transmission to the first device.

In another broad aspect, in at least one embodiment described herein, there is provided an intermediate electronic device for facilitating sending messages between a first device and a second device communicating using different first and second communication protocols respectively, wherein the intermediate electronic device comprises: a first port being configured to communicate with the first device using the first communication protocol; and a second port configured to communicate with the second device using the second communication protocol, wherein any first messages received by the first port according to the first communication protocol and including second information intended for the second device are sent to the second port for translation into translated second messages that include the second information and are formatted according to the second communication protocol for transmission to the second device, and wherein any second messages received by the second port according to the second communication protocol and including first information intended for the first device are translated into translated first messages, formatted according to the first communication protocol, and sent to the first port for transmission to the first device.

The first communication protocol communicates using frames comprising a control space and a data space and a given first message may be communicated according to a general control channel scheme in which information in the given first message for transmission using the second communication protocol is included in the control space.

In an alternative, the first communication protocol communicates using frames comprising a control space and a data space and a given first message may be communicated according to a dedicated control channel scheme in which information in the given first message for transmission using the second communication protocol is included in the data space.

The dedicated control channel scheme may be used for transmitting messages for use case scenarios requiring higher bandwidth.

The second communication protocol may comprise the I²C communication protocol.

The first communication protocol may comprise the multiformat communication protocol.

To facilitate communication with the second device, a START bit may be defined at the intermediate device, wherein a previous start value of the START bit in a previous frame and a current start value of the START bit in a current frame are used together to indicate four states of functionality for an I²C bus.

For example, the four states for an I²C bus may comprise an idle state in the current frame, a first active state where I²C communication is beginning in the current frame, a second active state where I²C communication is ending in the current frame and a continuation state where I²C communication is continuing in the current frame.

In at least some embodiments, a next transaction field may be used for the first communication protocol to indicate what data is to be transferred in a next command for a next or subsequent frame, thereby increasing transfer speed.

In at least some embodiments, the next command may comprise one of a prepare 8 bit read command, a prepare 16 bit command, and a resubmit START condition command.

In at least some embodiments, control bits may be used for the first communication protocol to indicate the start, stop and acknowledgement of messages or status of devices and ports including additional devices that communicate according to the second communication protocol.

In at least some embodiments, status bits may be used for the first communication protocol to indicate a delayed transfer or reception of messages between the intermediate device and the second device.

In at least some embodiments, message buffering may be used at the first device or the intermediate device to accommodate different transfer speeds between the first and second communication protocols.

In at least some embodiments, transmission message buffering may be used for the first communication protocol so that messages may be stored at a transmitting end before submitting.

In at least some embodiments, reception message buffering may be used for the second modified communication protocol so that the result of messages may be stored at a transmitting or a receiving end before submitting to a controller of the a bus that couples the first, second and intermediate devices.

It should be noted that a transmitting end may be a device that is sending a communication while a receiving end may be a device that is receiving a communication.

In at least some embodiments, the first communication protocol may comprise support for multiple different data formats at the same time comprising at least one of PDM, PCM and UART data as well as associated commands.

In at least some embodiments, the first communication protocol may comprise support for interrupt messages and status polling of devices attached to the bus.

In at least some embodiments, the first communication protocol may comprise support for interrupt messages and status polling of devices attached to the second communication protocol.

In another broad aspect, in at least one embodiment described herein, there is provided herein a computer readable medium comprising a plurality of instructions that are executable on a microprocessor of an intermediate device for adapting the intermediate device to implement a method for sending messages between a first device and a second device wherein the first and second devices communicate using first and second different communication protocols, wherein the method comprises: initializing a first port at the intermediate device for communicating with the first device; initializing a second port at the intermediate device for communicating with the second device; receiving at least one first message from the first device at the first port of the intermediate device using the first communication protocol, the at least one first message including second information needed for communicating according to the second communication protocol; generating at least one second message incorporating the second information at the second port according to the second communication protocol; and communicating the at least one second message via the second port between the intermediate device and the second device.

The method may be further defined as described above.

It should be understood that modifications can be made to the embodiments described and illustrated herein, without departing from the embodiments, the general scope of which is defined in the appended claims.

The invention claimed is:

1. A method for sending messages from a first device to a second device via an intermediate device, wherein the first and second devices communicate using first and second communication protocols respectively, the first and second communication protocols being different, the method comprising:
   initializing a first port at the intermediate device for communicating with the first device using the first communication protocol;
   initializing a second port at the intermediate device for communicating with the second device using the second communication protocol;
   sending any first messages received at the first port from the first device to the second port for translation into the second communication protocol and transmission to the second device; and
   translating any second messages received at the second port from the second device from the second communication protocol to the first communication protocol and sending the translated messages to the first port for transmission to the first device,
   wherein the second communication protocol comprises the $I^2C$ communication protocol, and
   wherein to facilitate communication with the second device, the method further comprises providing a START bit at the intermediate device, wherein a previous start value of the START bit in a previous frame and a current start value of the START bit in a current frame are used together to indicate four states of functionality for an $I^2C$ bus.

2. The method of claim 1, wherein the first communication protocol communicates using frames comprising a control space and a data space and a given first message is communicated according to a general control channel scheme in which information in the given first message for transmission using the second communication protocol is included in the control space.

3. The method of claim 1, wherein the first communication protocol communicates using frames comprising a control space and a data space and a given first message is communicated according to a dedicated control channel scheme in which information in the given first message for transmission using the second communication protocol is included in the data space.

4. The method of claim 3, wherein the dedicated control channel scheme is used for transmitting messages for use case scenarios requiring higher bandwidth than other use case scenarios.

5. The method of claim 1, wherein the method further comprises using a next transaction field for the first communication protocol to indicate what data is to be transferred in a next command for a next frame, thereby increasing transfer speed.

6. The method of claim 1, where the method further comprises using control bits for the first communication protocol to indicate the start, stop and acknowledgement of messages or status of devices and ports including additional devices that communicate according to the second communication protocol.

7. The method of claim 1, where the method further comprises using status bits for the first communication protocol to indicate a delayed transfer or reception of messages between the intermediate device and the second device.

8. The method of claim 1, where the method further comprises using message buffering at the first device or the intermediate device to accommodate different transfer speeds between the first and second communication protocols.

9. The method of claim 1, where the method further comprises using transmission message buffering for the first communication protocol so that messages is stored at a transmitting end before submitting.

10. The method of claim 1, where the first communication protocol comprises support for multiple different data formats at the same time comprising at least one of PDM, PCM and UART data and associated commands.

11. A non-transitory computer readable medium comprising a plurality of instructions that are executable on a microprocessor of an intermediate device for adapting the intermediate device to send messages between a first device and a second device wherein the first and second devices communicate using different first and second communication protocols, wherein the instructions result in:
   initializing a first port at the intermediate device for communicating with the first device;
   initializing a second port at the intermediate device for communicating with the second device;
   receiving at least one first message from the first device at the first port of the intermediate device using the first communication protocol, the at least one first message including information needed for communicating according to the second communication protocol;
   generating at least one second message incorporating the information at the second port according to the second communication protocol; and
   communicating the at least one second message via the second port between the intermediate device and the second device,
   wherein the second communication protocol comprises the I$^2$C communication protocol, and
   wherein, to facilitate communication with the second device, a START bit is provided at the intermediate device, wherein a previous start value of the START bit in a previous frame and a current start value of the START bit in a current frame are used together to indicate four states of functionality for an I$^2$C bus.

12. The computer readable medium of claim 11, wherein the first communication protocol communicates using frames comprising a control space and a data space and a given first message is communicated according to a general control channel scheme in which information in the given first message for transmission using the second communication protocol is included in the control space.

13. The computer readable medium of claim 11, wherein the first communication protocol communicates using frames comprising a control space and a data space and a given first message is communicated according to a dedicated control channel scheme in which information in the given first message for transmission using the second communication protocol is included in the data space.

14. The computer readable medium of claim 13, wherein the dedicated control channel scheme is used for transmitting messages for use case scenarios requiring higher bandwidth than other use case scenarios.

15. The computer readable medium of claim 11, wherein a next transaction field is used for the first communication protocol to indicate what data is to be transferred in a next command for a next frame, thereby increasing transfer speed.

16. An intermediate electronic device for facilitating sending messages between a first device and a second device communicating using different first and second communication protocols respectively, wherein the intermediate electronic device comprises:
   a first port being configured to communicate with the first device using the first communication protocol, and
   a second port configured to communicate with the second device using the second communication protocol,
   wherein any first messages received by the first port according to the first communication protocol and including second information intended for the second device are sent to the second port for translation into translated second messages that include the second information and are formatted according to the second communication protocol for transmission to the second device,
   wherein any second messages received by the second port according to the second communication protocol and including first information intended for the first device are translated into translated first messages, formatted according to the first communication protocol, and sent to the first port for transmission to the first device,
   wherein the second communication protocol comprises the I$^2$C communication protocol, and
   wherein, to facilitate communication with the second device, a START bit is provided, wherein a previous start value of the START bit in a previous frame and a current start value of the START bit in a current frame are used together to indicate four states of functionality for an I$^2$C bus.

17. The intermediate electronic device of claim 16, wherein the first communication protocol communicates using frames comprising a control space and a data space and a given first message is communicated according to a general control channel scheme in which information in the given first message for transmission using the second communication protocol is included in the control space.

18. The intermediate electronic device of claim 16, wherein the first communication protocol communicates using frames comprising a control space and a data space and a given first message is communicated according to a dedicated control channel scheme in which information in the given first message for transmission using the second communication protocol is included in the data space.

19. The intermediate electronic device of claim 18, wherein the dedicated control channel scheme is used for transmitting messages for use case scenarios requiring higher bandwidth than other use case scenarios.

20. The intermediate electronic device of claim 16, wherein a next transaction field is used for the first communication protocol to indicate what data is to be transferred in a next command for a next frame, thereby increasing transfer speed.

21. The intermediate electronic device of claim 16, wherein control bits are used for the first communication protocol to indicate start, stop and acknowledgement of messages or status of devices and ports including additional devices that communicate according to the second communication protocol.

22. The intermediate electronic device of claim 16, wherein status bits are used for the first communication protocol to indicate a delayed transfer or reception of messages between the intermediate device and the second device.

23. The intermediate electronic device of claim 16, wherein message buffering is used at the first device or the intermediate device to accommodate different transfer speeds between the first and second communication protocols.

24. The intermediate electronic device of claim 16, wherein transmission message buffering is used for the first communication protocol so that messages are stored at a transmitting end before submitting.

25. The intermediate electronic device of claim 16, wherein the first communication protocol comprises support for multiple different data formats at the same time comprising at least one of PDM, PCM and UART data and associated commands.

* * * * *